(12) United States Patent
Park et al.

(10) Patent No.: US 10,750,920 B2
(45) Date of Patent: Aug. 25, 2020

(54) CONTROL METHOD OF ROBOT SYSTEM INCLUDING PLURALITY OF MOVING ROBOTS

(71) Applicant: LG ELECTRONICS INC., Seoul (KR)

(72) Inventors: Sinyoung Park, Seoul (KR); Kyuhee Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 205 days.

(21) Appl. No.: 15/936,814

(22) Filed: Mar. 27, 2018

(65) Prior Publication Data
US 2018/0279847 A1    Oct. 4, 2018

(30) Foreign Application Priority Data
Mar. 28, 2017    (KR) .................. 10-2017-0039479

(51) Int. Cl.
*A47L 11/40*    (2006.01)
*A47L 9/28*    (2006.01)
(Continued)

(52) U.S. Cl.
CPC ......... *A47L 11/4011* (2013.01); *A47L 9/2857* (2013.01); *A47L 9/2868* (2013.01);
(Continued)

(58) Field of Classification Search
CPC .. A47L 11/4011; A47L 9/2857; A47L 9/2868; A47L 2201/04; A47L 2201/06;
(Continued)

(56) References Cited

U.S. PATENT DOCUMENTS 6,920,376 B2    7/2005    Jouppi
7,164,969 B2    1/2007    Wang
(Continued)

FOREIGN PATENT DOCUMENTS

CN    105034002    11/2015
EP    1 932 632    6/2008
(Continued)

OTHER PUBLICATIONS

Korean Office Action dated Dec. 6, 2018 issued in KR Application No. 10-2017-0085353.
(Continued)

*Primary Examiner* — Mussa A Shaawat
(74) *Attorney, Agent, or Firm* — Ked & Associates, LLP

(57) ABSTRACT

According to an aspect of the present disclosure, there is provided a method of controlling a robot system including a plurality of moving robots each assigned a cleaning area, the method including receiving a command designating an urgent cleaning area, at least one moving robot of the plurality of moving robots moving to the urgent cleaning area according to a predetermined criterion based on the command, performing a cleaning operation by the moving robot having moved to the urgent cleaning area and a moving robot assigned the urgent cleaning area as a cleaning area, and returning to an assigned cleaning area by the moving robot having moved to the urgent cleaning area when the cleaning operation is completed.

18 Claims, 15 Drawing Sheets

(51) Int. Cl.
*G05D 1/02* (2020.01)
*G05D 1/00* (2006.01)

(52) U.S. Cl.
CPC ......... *G05D 1/0027* (2013.01); *G05D 1/0291* (2013.01); *A47L 2201/04* (2013.01); *A47L 2201/06* (2013.01); *G05D 2201/0203* (2013.01)

(58) Field of Classification Search
CPC ............... G05D 1/0027; G05D 1/0291; G05D 2201/0203
See application file for complete search history.

(56) References Cited

U.S. PATENT DOCUMENTS

| | | | |
|---|---|---|---|
| 7,171,286 B2 | 1/2007 | Wang | |
| 8,265,793 B2 | 9/2012 | Cross | |
| 9,720,414 B1 | 8/2017 | Theobald | |
| 2003/0028993 A1* | 2/2003 | Song | A47L 9/009 15/319 |
| 2005/0171636 A1* | 8/2005 | Tani | G05D 1/0276 700/245 |
| 2005/0219356 A1 | 10/2005 | Smith | |
| 2005/0277477 A1 | 12/2005 | Hajder | |
| 2007/0143187 A1 | 6/2007 | Gottfurcht | |
| 2007/0150094 A1* | 6/2007 | Huang | G05D 1/0274 700/245 |
| 2007/0192910 A1 | 8/2007 | Vu et al. | |
| 2008/0154488 A1 | 6/2008 | Silva | |
| 2009/0173561 A1 | 7/2009 | Moriguchi et al. | |
| 2010/0094459 A1 | 4/2010 | Cho et al. | |
| 2010/0180709 A1 | 7/2010 | Choi | |
| 2013/0221101 A1 | 8/2013 | Lebaschi et al. | |
| 2015/0148951 A1 | 5/2015 | Jeon et al. | |
| 2016/0171303 A1 | 6/2016 | Moore et al. | |
| 2017/0011258 A1 | 1/2017 | Pitre | |
| 2017/0075962 A1 | 3/2017 | Hitchcock | |
| 2017/0129602 A1 | 5/2017 | Alduaiji | |
| 2017/0221130 A1 | 8/2017 | Kraus | |
| 2018/0009108 A1 | 1/2018 | Yamamoto | |
| 2018/0178375 A1 | 6/2018 | Yang | |
| 2018/0178377 A1 | 6/2018 | Yang | |
| 2018/0192845 A1* | 7/2018 | Gu | A47L 11/4061 |
| 2019/0005545 A1 | 1/2019 | Roh | |
| 2019/0107833 A1 | 4/2019 | Song | |

FOREIGN PATENT DOCUMENTS

| | | |
|---|---|---|
| EP | 2 025 478 | 2/2009 |
| JP | 2002-355779 | 12/2002 |
| JP | 2004-017200 | 1/2004 |
| JP | 2005-172879 | 6/2005 |
| JP | 2007-229817 | 9/2007 |
| JP | 2017-097207 | 6/2017 |
| KR | 10-0916493 | 9/2009 |
| KR | 10-2009-0128637 | 12/2009 |
| KR | 10-2010-0006975 | 1/2010 |
| KR | 10-2012-0111519 | 10/2012 |
| KR | 10-1193610 | 10/2012 |
| KR | 10-1243262 | 3/2013 |
| KR | 20-0481042 | 8/2016 |
| WO | WO 2007/041295 | 4/2007 |
| WO | WO 2016/094013 | 6/2016 |

OTHER PUBLICATIONS

Korean Office Action dated Dec. 7, 2018 issued in KR Application No. 10-2017-0085368.
European Search Report dated Nov. 16, 2018 issued in Application No. 18177444.9.
Minute Explained: "R2-D2's Tools Explained! The Ultimate Intergalactic Swiss Army Knife"; https://www.youtube.com/watch?v-cjwVwqUV4LA retrieved on May 7, 2018 (XP-054978324).
European Search Report dated May 17, 2018 issued in Application No. 17209452.6.
European Search Report dated May 18, 2018 issued in Application No. 17209458.3.
European Search Report dated May 23, 2018 issued in Application No. 17209459.1.
European Search Report dated Sep. 7, 2018 issued in Application No. 18164322.2.
U.S. Final Office Action dated Oct. 7, 2019 issued in U.S. Appl. No. 16/020,579.
U.S. Office Action dated Apr. 19, 2019 issued in U.S. Appl. No. 16/020,579.
U.S. Office Action dated Sep. 13, 2019 issued in co-pending U.S. Appl. No. 15/853,409.
U.S. Office Action dated Mar. 4, 2020 issued in U.S. Appl. No. 16/020,579.
U.S. Office Action dated Feb. 21, 2020 issued in U.S. Appl. No. 15/853,409.
Ignatiev et al. Autonomous omni-wheeled mobile robots, 2016, IEEE, pp. 1-4 (Year: 2016).
Lemberg et al., AILA—design of an autonomous mobile dual-arm robot, 2011, IEE, p. 5147-5153 (Year: 2011).
Herbert et al., Supervised Remote Robot with Guided Autonomy and Teleoperation (SURROGATE): A framework for whole-body manipulation, 2015, IEEE, p. 5509-5516 (Year: 2015).
Zhang et al., A networked teleoperation system for mobile robot with wireless serial communication, 2009, IEEE, p. 2227-2231 (Year: 2009).
U.S. Office Action dated Jan. 3, 2020 issued in U.S. Appl. No. 15/853,587.

* cited by examiner

CONTROL METHOD OF ROBOT SYSTEM INCLUDING PLURALITY OF MOVING ROBOTS

CROSS-REFERENCE TO RELATED APPLICATION

This application claims priority under 35 U.S.C. § 119 to Korean Patent Application No. 10-2017-0039479, filed on Mar. 28, 2017, whose entire disclosure is hereby incorporated by reference.

BACKGROUND

1. Field

The present disclosure relates to a control method of a robot system including a plurality of mobile robots, and more particularly, to a control method of a robot system including a plurality of moving robots for cleaning a cleaning area allocated in a public place.

2. Background

Robots have been developed for industrial use and have been part of factory automation. In recent years, with the expansion of robot application fields, medical robots, aerospace robots, and the like have been developed, and even household robots that can be used in ordinary homes have been developed. Among these robots, robots capable of autonomously traveling are called moving robots.

A typical example of a moving robot is a cleaning robot (a robot cleaner). The cleaning robot is a device configured to clean an intended area by suctioning dust or foreign matter around the robot while autonomously traveling around a certain area.

With a cleaning robot, better work efficiency can be obtained than when cleaning is performed by human force, and there is no restriction on the cleaning work time as the cleaning work can be unceasingly performed. Cleaning robots are also effective in swiftly cleaning public places with large areas such as airports, train stations, department stores, and harbors throughout the year, including vulnerable areas that require frequent cleaning.

A plurality of cleaning robots needs to be provided and operated to clean and manage such a large space. In this case, a plurality of cleaning robots performs a cleaning operation in an allocated cleaning area. However, cleaning difficulty and execution time may significantly vary even in the same cleaning area depending on situation.

In operating a plurality of cleaning robots, there is a need for a method of effectively controlling the plurality of cleaning robots in order to improve cleaning efficiency. In addition to a normal cleaning operation of cleaning an allocated cleaning area at a scheduled time, there is a need for a method to effectively cope with situations requiring urgent cleaning.

BRIEF DESCRIPTION OF THE DRAWINGS

The embodiments will be described in detail with reference to the following drawings in which like reference numerals refer to like elements wherein.

DETAILED DESCRIPTION

A moving robot 100 may refer to a robot capable of autonomously moving using wheels or the like, and may be a robot cleaner or the like. Hereinafter, a cleaning robot (a robot cleaner) having a cleaning function among moving robots will be described with reference to the drawings, but the present disclosure is not limited thereto.

Figure 1:
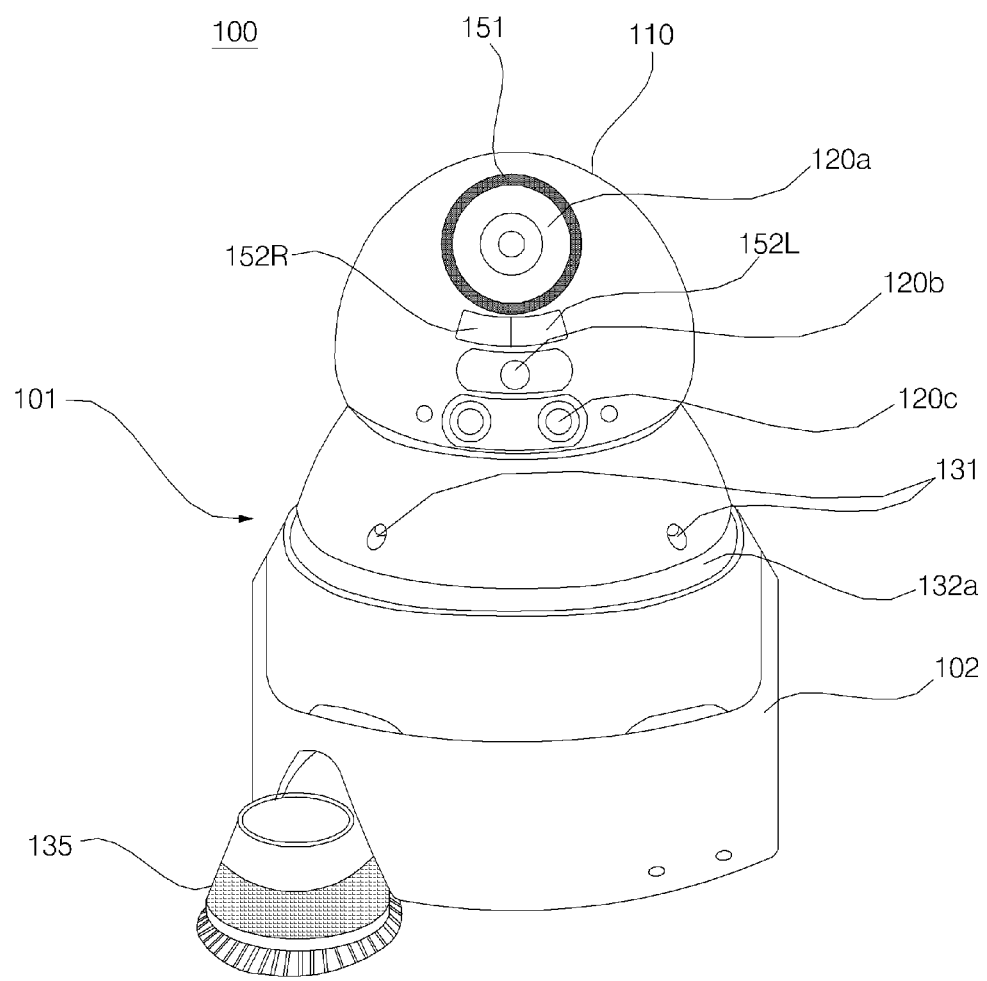
FIG. 1 is a front view of a moving robot included in a robot system according to an embodiment of the present disclosure.
Figure 2:
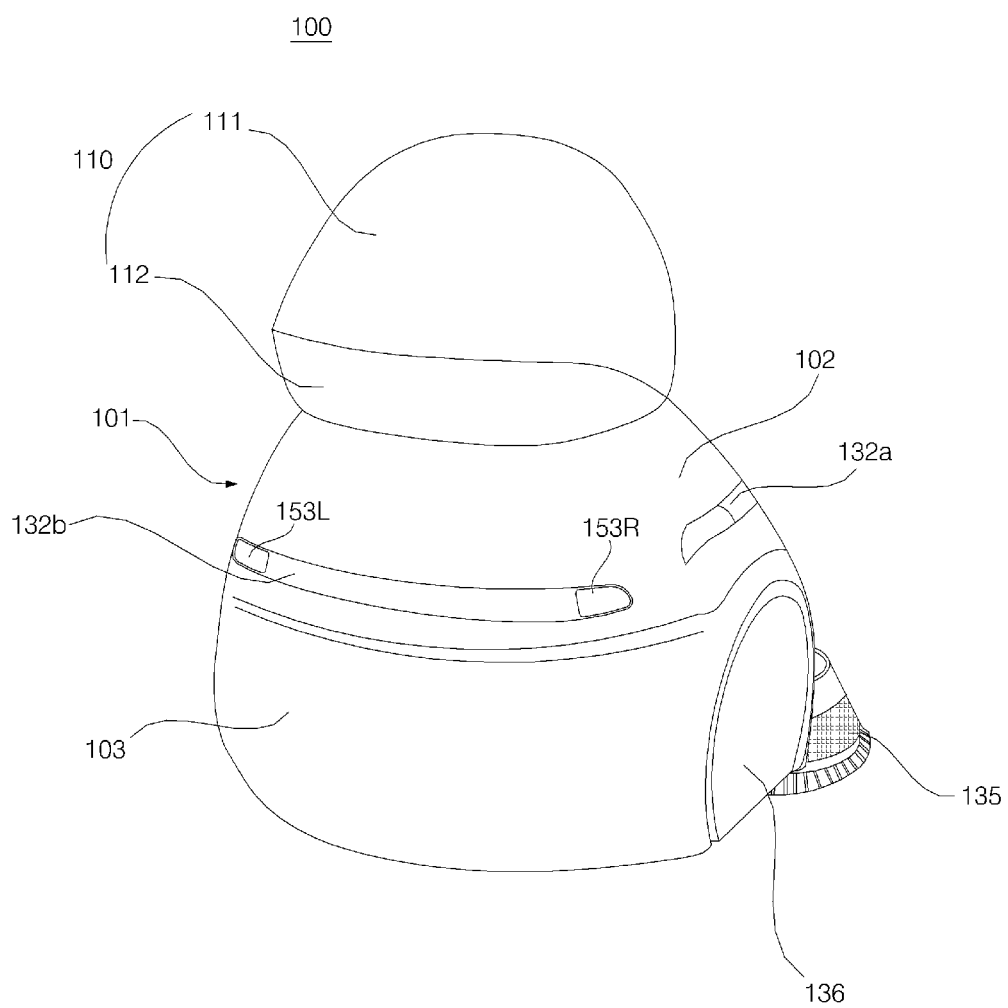
FIG. 2 is a rear view showing the moving robot included in a robot system according to an embodiment of the present disclosure.
Figure 3:
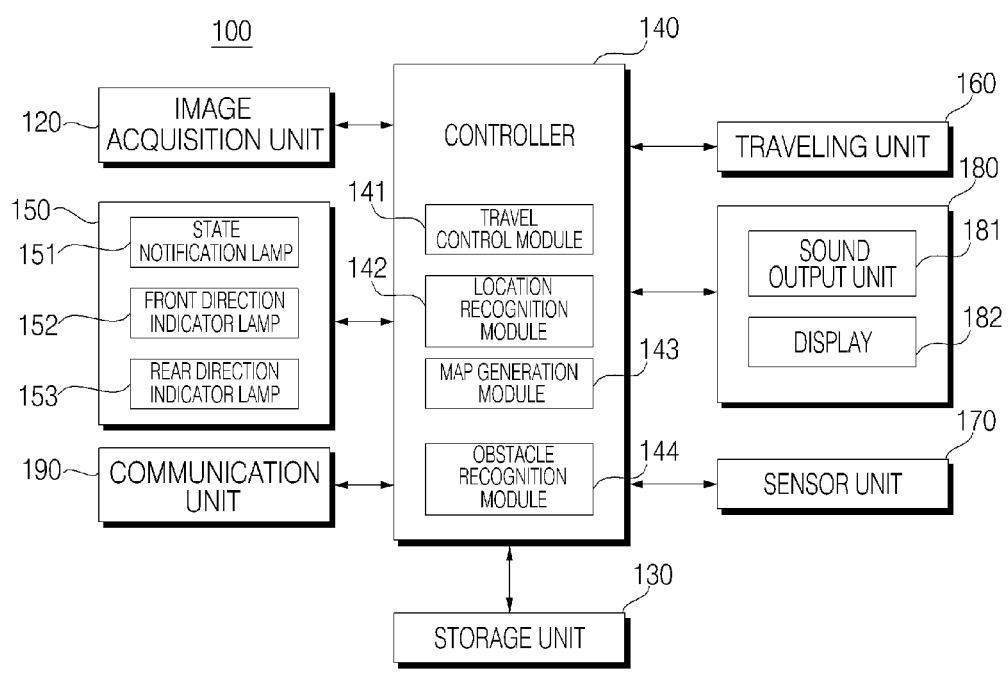
FIG. 3 is a block diagram illustrating a control relationship between the main components of a moving robot included in a robot system according to an embodiment of the present disclosure.

The robot system may include a plurality of moving robots exemplarily illustrated in FIGS. 1 to 3. The robot system may further include a server and a portable terminal. The robot system may further include other kinds of robots in addition to a moving robot having a cleaning function. The moving robot 100 may include a main body 101 and a traveling unit 160 for moving the main body 101. In defining the respective portions of the main body 101, a portion facing the ceiling in a travel area may be defined as a top face portion, a portion facing the floor in the travel area may be defined as a bottom face portion, and a part of the circumference of the main body 101 between the top face portion and the bottom face portion that faces in the travel direction may be defined as a front portion, and a part of the circumference of the main body 101 facing in the opposite direction to the front portion may be defined as a rear face portion.

The moving robot 100 includes a traveling unit or a bottom section 160 for moving the main body 101. The traveling unit 160 includes at least one drive wheel 136 for moving the main body 101. The traveling unit 160 includes a drive motor connected to the drive wheel 136 to rotate the drive wheel. The drive wheels 136 may be provided on the left and right sides of the main body 101, respectively, and will be referred to as a left wheel and a right wheel.

The left wheel and the right wheel may be driven by a single drive motor. If necessary, a left wheel drive motor for driving the left wheel and a right wheel drive motor for driving the right wheel may be provided. It is possible to change the travel direction of the main body 101 to the left or right by creating a difference in rotational speed between the left and right wheels.

A suction port through which air is suctioned may be formed in the bottom face portion of the main body 101. A suction device for providing suction force to suction air through the suction port and a dust container for collecting the dust suctioned together with the air through the suction port may be provided in the main body 101. In addition, a dust container cover may be provided in the dust container to allow the dust in the dust container to be discarded.

The main body 101 may include a body part or section 102 defining a space in which various components constituting the moving robot 100 are accommodated and a head part or section 110 openably arranged on the upper side of the body part 102. The head part 110 may include an openable head 111 (e.g., lid) and a coupling portion or section 112 to which the openable head 111 is coupled.

In addition, a switch or a sensor for sensing whether the head 111 is opened or closed may be provided on the head 111 and/or the coupling portion 112. The moving robot 100 may also include a display 182 housed in the main body 101.

The user can insert and detach the dust container into and from the main body 101 by opening the head 111. In some embodiments, the head part 110 may be opened and closed in a plurality of ways or may include one or more opening/closing mechanisms. For example, the head 111 may be opened when the head 111 is lifted. Alternatively, an opening/closing mechanism may be implemented in such a manner that a button is provided on the head part 110, and when the user presses the button, a predetermined cover is opened toward the user.

In this case, the display 182 may be arranged in a predetermined area partitioned in the inner housing space, and the opening/closing mechanism structure opened by operation of a button by the user may be configured as a dedicated opening/closing structure of the area where the display 182 is arranged. Accordingly, the display 182 may be configured to protrude toward the user when the user presses the button.

The moving robot 100 may include a roll-type main brush having bristles exposed through a suction port, and an auxiliary brush 135 positioned on the front side of the bottom face portion of the main body 101 and having a plurality of radially extending blades. Dust is separated from the floor in the travel area by rotation of these brushes 135. The dust separated from the floor is suctioned through the suction port and collected in the dust container.

The moving robot 100 may include a power supply provided with a rechargeable battery to supply power to the moving robot 100. The power supply supplies driving power and operating power to the respective components of the moving robot 100 and can be charged by receiving a charging current from a charging base when the remaining power is insufficient.

The moving robot 100 may further include a battery sensing unit for sensing a charging state of a battery and transmitting the result of sensing to the controller 140. The battery is connected to the battery sensing unit, and thus the remaining charge of the battery and the charging state are transmitted to the controller 140. The remaining charge of the battery may be displayed on the display 182 of the output unit 180.

The battery supplies power necessary for overall operation of the moving robot 100 including operation of the drive motor. The body part 102 may include an openable cover 103 for battery checking and/or replacement. The user can open the cover 103 to check the battery condition or replace the battery.

When the battery is discharged, the moving robot 100 may travel to return to the charging base for charging. During return traveling, the moving robot 100 may autonomously detect the position of the charging base. The charging base may include a signal transmission unit for transmitting a predetermined return signal. The return signal may be, but not limited to, an ultrasonic signal or an infrared signal.

The moving robot 100 may include a signal sensing unit for receiving the return signal. The charging base may transmit an infrared signal through the signal transmission unit, and the signal sensing unit may include an infrared sensor for sensing the infrared signal. The moving robot 100 may move to the position of the charging base according to the infrared signal transmitted from the charging base and docks on the charging base. Charging is performed between the charging terminal of the moving robot 100 and the charging terminal of the charging base by the docking.

An image acquisition unit 120 photographs the vicinity of the main body 101, the travel area, and the external environment, and may include a camera module. The camera module may include a digital camera. The digital camera may include at least one optical lens, an image sensor (e.g., a CMOS image sensor) including a plurality of photodiodes (e.g., pixels) on which an image is focused by light passing through the optical lens, and a digital signal processor (DSP) for configuring an image based on signals output from the photodiodes. The DSP is capable of generating not only a still image but also moving images composed of frames consisting of still images.

An image captured by the camera may be used to identify the kinds of materials such as dust, hair, and floor present in a corresponding space, whether the space is cleaned, or the cleaning time. The image acquisition unit 120 may acquire an image by photographing the surroundings of the main body 101, and the acquired image may be stored in the storage unit 130.

Multiple cameras may be installed on several parts in consideration of photographing efficiency. For example, the image acquisition unit 120 may include an upper camera 120a for capturing an image of the upper side of a travel area in front of the main body 101 to acquire an image of the ceiling in the travel area, a front camera 120b for acquiring an image of the area in front of the main body 101, and a depth camera 120c. However, the number, arrangement, type, and photographing range of the image acquisition unit 120 are not necessarily limited thereto.

The upper camera 120a may acquire an image of the ceiling in a travel area and the moving robot 100 may use the image acquired by the upper camera 120a for simultaneous localization and mapping (SLAM).

The front camera 120b may capture an image of the situation of an obstacle or a cleaning area present ahead of the moving robot 100 in the travel direction of the moving robot 100, and a user recognition image.

A state notification lamp 151 (e.g., light or display) may be embodied in a circular ring shape surrounding the upper camera 120a. The moving robot 100 may also include a sensor unit 170 including sensors for sensing various data related to the operation and state of the moving robot.

For example, the moving robot 100 may include a sensor for sensing whether the head 111 is open or closed. Sensors using various known techniques may be used as the sensor for sensing whether the head 111 is open or closed.

The sensor unit 170 may include an obstacle detection sensor 131 for sensing an obstacle ahead. The sensor unit 170 may further include a cliff detection sensor for sensing presence of a cliff on the floor in the travel area, and a lower camera sensor for acquiring an image of the floor.

According to an embodiment, the obstacle detection sensor 131 may include a plurality of sensors arranged on the outer circumferential surface of the moving robot 100 at regular intervals. For example, the sensor unit 170 may include a first sensor and a second sensor which are provided on the front surface of the main body 101 and are horizontally spaced apart from each other.

The obstacle detection sensor 131 may include an infrared sensor, an ultrasonic sensor, a radio frequency (RF) sensor, a geomagnetic sensor, and a position sensitive device (PSD) sensor. The position and type of the sensor included in the obstacle detection sensor 131 may vary depending on the type of the moving robot, and the obstacle detection sensor 131 may include various other sensors.

The sensor unit 170 may also include light detection and ranging (Lidar) 132a and 132b. The Lidar 132a and 132b may detect an object such as an obstacle based on the TOF (Time of Flight) of the transmission signal and the reception signal or a phase difference between the transmission signal and the reception signal through the laser light.

The Lidar 132a and 132b may be provided in plural. For example, the Lidar 132a and 132b may include a first Lidar 132a for detecting an object positioned in front of the moving robot 100 and a second Lidar 132b for detecting an object positioned behind the moving robot 100. Further, the Lidar 132a and 132b may detect the distance to the object, the relative speed with respect to the object, and the position of the object. The Lidar 132a and 132b may be provided as part of the configuration of the obstacle detection sensor 131.

The Lidar 132a and 132b may be provided as sensors for creating a map. For example, a map generation module 143 may create a map of the travel area. The map generation module 143 may create a map by processing the image acquired through the image acquisition unit 120, or may supplementarily or independently create a map based on the sensing data of the Lidar 132a and 132b.

The obstacle detection sensor 131 senses an object, particularly an obstacle, existing in the traveling direction of the moving robot, and transmits the obstacle information to the controller 140. The obstacle detection sensor 131 may sense protrusions, household appliances, furniture, walls, wall corners and the like present on the movement path of the moving robot 100, or the front or side of the moving robot 100 and transmit the information thereon to the control unit.

In this operation, the controller 140 may sense the position of the obstacle based on at least two signals received through the ultrasonic sensor, and control the movement of the moving robot 100 according to the sensed position of the obstacle. According to an embodiment, the signals received by the obstacle detection sensor 131 may undergo signal processing such as amplification and filtering, and then the distance to the obstacle and the azimuth of the obstacle may be calculated.

According to an embodiment, the obstacle detection sensor 131 arranged on the outer surface of the main body 101 may include a transmitter and a receiver. For example, the ultrasonic sensor may be provided with at least one transmitter and at least two receivers, which are alternately arranged. The ultrasonic sensor may radiate signals at various angles and receive signals reflected from obstacles at various angles.

The sensor unit 170 may further include a motion sensor for sensing motion of the moving robot 100 according to driving of the main body 101 and outputting motion information. For example, a gyro sensor, a wheel sensor, an acceleration sensor, or the like may be used as the motion sensor.

The gyro sensor senses the direction of rotation and detects the rotation angle when the moving robot 100 moves according to the operation mode. The gyro sensor detects the angular velocity of the moving robot 100 and outputs a voltage value proportional to the angular velocity. The controller 140 calculates the rotation direction and the rotation angle using the voltage value output from the gyro sensor.

The wheel sensor is connected to the left and right wheels to detect the number of revolutions of the wheel. The wheel sensor may be a rotary encoder. The rotary encoder senses and outputs the number of revolutions of the left and right wheels.

The controller 140 may calculate the rotational speeds of the left and right wheels using the number of rotations. The controller 140 may also calculate the rotation angle using the difference in the number of revolutions between the left and right wheels.

The acceleration sensor senses change in speed of the moving robot 100, for example, change in the moving robot 100 due to start, stop, change of direction, collision with an object or the like. The acceleration sensor is provided at a position adjacent to the main wheel or the auxiliary wheels to detect slippage or idling of the wheels.

The acceleration sensor may be embedded in the controller 140 to sense change in speed of the moving robot 100. For example, the acceleration sensor detects the amount of impact according to the speed change and outputs a corresponding voltage value. The acceleration sensor may perform the function of an electronic bumper.

The controller 140 may calculate positional change of the moving robot 100 based on the motion information output from the motion detection sensor. This position is a relative position corresponding to the absolute position which is based on the image information. By recognizing the relative position, the moving robot may improve performance of position recognition using image information and obstacle information.

The moving robot 100 may also include an output unit 180, and thus may display images or output sound corresponding to reservation information, a battery state, an operation mode, an operation state, an error state, and the like. The output unit 180 may include a display 182 for displaying an image of a user interface screen for the reservation information, the battery state, the operation mode, the operation state, the error state, and the like.

According to an embodiment, when the head 111 is opened, the display 182 may be slid or pushed to the front to allow the user to more easily recognize the user interface screen provided through the display 182. The display 182 may form a layered structure together with a touch pad, thereby implementing a touchscreen. In this case, the display 182 may be used not only as an output device but also as an input device for inputting information by user touch.

The output unit 180 may further include a sound output unit 181 for outputting an audio signal. The sound output unit 181 may output a warning sound or sound corresponding to an alarm message for an operation mode, an operation state, an error state, and the like, under control of the controller 140. The sound output unit 181 may convert an electric signal from the controller 140 into an audio signal and output the audio signal. The sound output unit 181 may be a speaker.

Referring to FIG. 3, the moving robot 100 includes a controller 140 for processing and determining various information including recognizing a current location, and a storage unit 130 for storing various data. The moving robot 100 may further include a communication unit 190 for transmitting and receiving data to and from a portable terminal, a server, another moving robot, a guide robot, and the like. The controller 140 controls overall operation of the moving robot 100 by controlling the image acquisition unit 120, the traveling unit 160, the display 182, and the like, which constitute the moving robot 100.

The portable terminal is provided with an application for controlling the moving robot 100. Through execution of the application, the portable terminal may display a map of a travel area for the moving robot 100 to clean, and may specify an area to be cleaned on the map. Examples of the portable terminal may include a remote control, a PDA, a laptop, a smartphone, and a tablet, in which an application for setting a map is embedded.

The portable terminal may communicate with the moving robot 100 to display the current location of the moving robot along with the map. Information about a plurality of areas may be displayed. The portable terminal updates and displays the position according to travel of the moving robot. The moving robot 100 may share or transmit/receive data with the server or other robots through the communication unit 190.

The storage unit 130 records various kinds of information necessary for control of the moving robot 100, and may include a volatile or nonvolatile recording medium. The recording medium stores data that is readable by a microprocessor. The recording medium may include a hard disk drive (HDD), a solid state drive (SSD), a silicon disk drive (SDD), ROM, RAM, CD-ROM, a magnetic tape, a floppy disk, and an optical data storage. The storage unit 130 may store cleaning history information. Such cleaning history information may be generated each time cleaning is performed.

The storage unit 130 may also store a map of the travel area. The map may be input by a portable terminal, a server, or the like which is capable of exchanging information with the moving robot 100 through wired or wireless communication, or may be generated by the moving robot 100. Locations of the rooms in the travel area may be marked on the map. The current location of the moving robot 100 may be also marked on the map, and the current location of the moving robot 100 on the map may be updated during travel. The portable terminal may store the same map as the map stored in the storage unit 130.

The map of the travel area stored in the storage unit 130 may include a navigation map used for traveling during cleaning, a simultaneous localization and mapping (SLAM) map used for location recognition, a learning map for storing information on an obstacle encountered during travel and using the information in learning and cleaning, a global position map used for global position recognition, and an obstacle recognition map for recording information on a recognized obstacle.

As described above, the maps may be classified, stored and managed in the storage unit 130 according to use thereof. However, the maps may not be clearly classified according to use thereof. For example, a plurality of pieces of information may be stored in one map such that the map can be used for at least two or more uses.

The controller 140 may include a travel control module 141, a location recognition module 142, a map generation module 143, and an obstacle recognition module 144.

Referring to FIGS. 1 to 3, the travel control module 141, which is configured to control traveling of the moving robot 100, controls driving of the traveling unit 160 according to the traveling setting. In addition, the travel control module 141 may identify the travel path of the moving robot 100 based on the operation of the traveling unit 160. For example, the travel control module 141 may identify the current or past traveling speed and traveling distance of the moving robot 100 based on the rotational speed of the drive wheel 136, and may also identify the current or past redirection process according to the direction of rotation of each drive wheel. Based on the travel information about the moving robot 100 identified in this way, the position of the moving robot 100 on the map may be updated.

The map generation module 143 may generate a map of the travel area. The map generation module 143 may create a map by processing an image acquired through the image acquisition unit 120. A cleaning map corresponding to a cleaning area may be created. The map generation module 143 may also process the image acquired through the image acquisition unit 120 at each position to recognize the global position in association with the map.

The location recognition module 142 estimates and recognizes the current location. The location recognition module 142 identifies the position of the moving robot 100 in association with the map generation module 143 by using the image information of the image acquisition unit 120, thereby estimating and recognizing the current location even if the position of the moving robot 100 suddenly changes.

The moving robot 100 may recognize the location during continuous travel through the location recognition module 142. The moving robot 100 may learn the map and estimate the current location through the map generation module 143 and the obstacle recognition module 144 without the location recognition module 142.

While the moving robot 100 is traveling, the image acquisition unit 120 acquires images of the surroundings of the moving robot 100. Hereinafter, the image acquired by the image acquisition unit 120 will be defined as an "acquired image." An acquired image includes various features such as lights, edges, corners, blobs, and ridges which are positioned on the ceiling.

The map generation module 143 detects the features from each acquired image. Various methods of detecting features from an image (Feature Detection) are known in the field of computer vision. Several feature detectors suitable for detecting these features are known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, Gray-level blobs detectors, and the like.

The map generation module 143 calculates a descriptor based on each feature point. The map generation module 143 may convert the feature point into a descriptor using a scale invariant feature transform (SIFT) technique for feature detection. The descriptor may be denoted by an n-dimensional vector.

SIFT is capable of detecting features invariable with respect to scale, rotation, and brightness change of a subject to be photographed. Accordingly, SIFT may detect features which are invariant (i.e., rotation-invariant) even if the same region is photographed by changing the pose of the moving robot 100. Of course, the present disclosure is not limited thereto, and various other techniques (for example, Histogram of Oriented Gradient (HOG), Haar feature, Fems, Local Binary Pattern (LBP), and Modified Census Transform (MCT)) may be employed.

The map generation module 143 may classify at least one descriptor for each acquired image into a plurality of groups according to a predetermined subclassification rule based on the descriptor information obtained through the acquired image at each position, and convert the descriptors included in the same group into sub-representation descriptors according to a predetermined sub-representation rule.

As another example, all descriptors gathered from acquired images in a predetermined area, such as a room, may be classified into a plurality of groups according to the predetermined subclassification rule, and convert descriptors included in the same group into sub-representation descriptors according to the predetermined sub-representation rule.

The map generation module 143 may obtain the feature distribution of each position through the above process. Each position feature distribution may be represented by a histogram or an n-dimensional vector. As another example, the map generation module 143 may estimate an unknown current location based on descriptors calculated from each feature point, without going through the predetermined subclassification rule and the predetermined sub-representation rule.

In addition, when the current location of the moving robot 100 becomes unknown due to a positional jump or the like, the current location may be estimated based on data such as pre-stored descriptors or sub-representation descriptors.

The moving robot 100 acquires an acquired image through the image acquisition unit 120 at an unknown current location. Various features such as lights, edges, corners, blobs, and ridges which are positioned on the ceiling are identified through the image.

The location recognition module 142 detects features from the acquired image. Various methods of detecting features from an image in the field of computer vision technology and various feature detectors suitable for detection of these features have been described above.

The location recognition module 142 calculates a recognition descriptor through the recognition descriptor calculation step based on each recognition feature point. In this case, the recognition feature point and the recognition descriptor are mentioned to describe the process performed by the location recognition module 142, and are distinguished from the terms used to describe the process performed by the map generation module 143. The features of the external world of the moving robot 100 are merely defined by different terms.

The location recognition module 142 may convert the recognition feature point into a recognition descriptor using the Scale Invariant Feature Transform (SIFT) technique in consideration of feature detection. The recognition descriptor may be denoted by an n-dimensional vector.

As described above, the SIFT is an image recognition technique for selecting features points that are easily identifiable, such as corner points, in the acquired image, and then estimating an n-dimensional vector having numerical values in the respective dimensions which represent the degree of change in each direction regarding the distribution characteristics (the direction of change of brightness and the degree of change) of the brightness gradient of pixels belonging to a certain region around each feature point.

The location recognition module 142 converts the information into location information (e.g., feature distribution at each location), which is a comparison target, and comparable information (sub-recognition feature distribution) based on information on at least one recognition descriptor obtained through the acquired image at an unknown current location according to a predetermined sub-conversion rule.

Each location feature distribution may be compared with each recognition feature distribution according to a predetermined sub-comparison rule to calculate each similarity. The location-specific similarity (probability) corresponding to each location may be calculated, and the location at which the greatest probability is calculated may be determined as the current location.

In this manner, the controller 140 may distinguish the travel area, and then generate a map composed of a plurality of regions or recognize the current location of the main body 101 based on the pre-stored map. When the map is generated, the controller 140 may transmit the generated map to a portable terminal, a server, or the like through the communication unit 190. In addition, as described above, the controller 140 may store the map in a storage unit when a map is received from the portable terminal, the server, or the like.

When the map is updated during traveling, the controller 140 transmits the updated information to the portable terminal such that the map stored in the moving robot 100 is the same as the map stored in the portable terminal. As the map stored in the portable terminal is maintained to be the same as the map stored in the moving robot 100, the moving robot 100 may clean a designated area according to a cleaning command from the mobile terminal. The current location of the moving robot may be displayed on the portable terminal. The map may include the cleaning area divided into a plurality of areas, a connection path connecting the plurality of areas, and information on obstacles in the areas.

When the cleaning command is input, the controller 140 determines whether or not the position on the map matches the current location of the moving robot. The cleaning command may be input via a remote control, a display, or the portable terminal.

If the current location does not match the position on the map or the current location cannot be identified, the controller 140 may recognize and restore the current location of the moving robot 100, and then control the traveling unit 160 to move the moving robot to a designated area. The location recognition module 142 may analyze the acquired image input from the image acquisition unit 120 and estimate the current location based on the map. The obstacle recognition module 144 or the map generation module 143 may also recognize the current location in the same manner.

After restoring the current location of the moving robot 100 by recognizing the location, the travel control module 141 calculates the travel path from the current location to the designated area and controls the traveling unit 160 to move to the designated area.

When cleaning pattern information is received from the server, the travel control module 141 may divide the entire travel area into a plurality of areas according to the received cleaning pattern information and set one or more areas as designated areas. The travel control module 141 may calculate a travel path according to the received cleaning pattern information, and perform cleaning while travelling along the travel path.

The controller 140 may store the cleaning record in the storage unit 130 when cleaning of the designated area is completed.

In addition, the controller 140 may transmit the operation state of the moving robot 100 or the cleaning state to the portable terminal and the server through the communication unit 190 with a predetermined periodicity. Based on the received data, the portable terminal displays the location of the moving robot along with the map on the screen of the running application and also outputs information about the cleaning state.

The moving robot 100 according to an embodiment of the present disclosure may move until an obstacle or a wall surface is sensed in one direction and if the obstacle is recognized through the sensor unit 170 and the obstacle recognition module 144, the moving robot 100 may determine a travel pattern such as a straight run or a rotation according to the attribute of the recognized obstacle.

For example, if the recognized obstacle is an obstacle of a kind that can be crossed over, the moving robot 100 may continue to move straight ahead. If the recognized obstacle is an obstacle of a kind that cannot be crossed over, the moving robot 100 may rotate and travel a certain distance, move to a distance at which the obstacle is sensed in the direction opposite to the original movement direction, thereby traveling in a zigzag pattern.

The moving robot 100 may perform obstacle recognition and avoidance based on machine learning. The controller 140 may include an obstacle recognition module 144 for recognizing an obstacle learned through machine learning in an input image and a travel control module 141 for controlling driving of the traveling unit 160 based on the recognized obstacle attribute. The moving robot 100 may include an obstacle recognition module 144 that has learned the attributes of an obstacle by machine learning. Machine learning means that the computer learns from the data without direct instruction of the logic from a human to a computer such that the computer can autonomously address a problem.

Deep learning is a method of teaching a computer how to think like a human based on artificial neural networks (ANN). Deep learning is an artificial intelligence technology that allows a computer to learn like a human being without being taught by a human. The ANN may be implemented in a software form or a hardware form such as a chip. The obstacle recognition module 144 may include an artificial neural network (ANN) in the form of software or hardware that has learned attributes of obstacles.

For example, the obstacle recognition module 144 may include a deep neural network (DNN) such as a convolutional neural network (CNN), a recurrent neural network (RNN) and a deep belief network (DBN) having undergone learning by deep learning. The obstacle recognition module 144 may determine the attributes of an obstacle included in the input image data based on the weights among the nodes included in the DNN.

When the sensor unit 170 senses an obstacle during travel of the moving robot 100, the controller 140 may perform a control operation to extract an area in the image acquired by the image acquisition unit 120 according to the direction in which the obstacle is sensed by the sensor unit 170. The image acquisition unit 120 may acquire an image within a predetermined angular range with respect to the direction in which the moving robot 100 moves.

The obstacle recognition module 144 may recognize the obstacle in the image acquired by the image acquisition unit 120, based on the data pre-learned by machine learning. The obstacle recognition module 144 may also identify the type of an object to be cleaned.

Referring to FIGS. 1 to 3, the moving robot 100 may include a lamp unit or a light source 150 including various lamps or lights having a signaling function for informing people of the traveling state of the moving robot 100. The lamp unit 150 may include a state notification lamp 151 for outputting light indicative of a current state of the moving robot 100, a front direction indicator lamp 152 provided on the front surface of the main body 101 and turned on according to the travel direction of the moving robot 100, and a rear direction indicator lamp 153 provided on the rear surface of the main body 101 and turned on according to the travel direction of the moving robot 100.

The lamps 151, 152, and 153 of the lamp unit 150 may each include one or more light sources. For example, the state notification lamp 151, the front direction indicator lamp 152, and the rear direction indicator lamp 153 may each include one or more light emitting diodes (LEDs).

Conventional analog lamps have a limitation in precise illuminance control, while illuminance of an LED may be precisely controlled by adjusting the amount of current applied and the width of a driving pulse. Further, when light emitting diodes (LEDs) of R, G, and B colors are provided in combination, light of a specific color can be provided and color temperature can be easily controlled. The LED may be a single-color LED such as Red, Blue, Green, and White. According to an embodiment, the LED may be a multicolor LED capable of reproducing a plurality of colors.

Referring to FIG. 1, the state notification lamp 151 may have a circular ring shape. The state notification lamp 151 may be arranged in a circular ring shape along the front outer edge of one of the cameras included in the image acquisition unit 120. The state notification lamp 151 may include a plurality of LEDs. The plurality of LEDs may provide white light by emitting white light, or provide light of a specific color or white by combining a red LED, a blue LED, and a green LED. For example, the state notification lamp 151 may output light of a first color (yellowish white) indicating a standby/stop state, light of a second color (bluish green) indicating cleaning in progress, and a third color (red) indicating a pause or error state. The state notification lamp 151 may be turned off a predetermined time after outputting light of the first color indicating the standby/stop state.

In a case where the state notification lamp 151 includes a plurality of LEDs, the LEDs may be turned on simultaneously, and then be sequentially turned off at regular intervals. Further, at the start of initial cleaning, all of the LEDs of the state notification lamp 151 may simultaneously blink once and output light of a second color indicating cleaning in progress.

The state notification lamp 151 may indicate a current progress state through the output light, and serve as a kind of signal light for notifying of stop, avoidance, and state change to avoid human bodies. For example, in the event of a pause/error, the state notification lamp 151 may provide red light. In addition, in avoiding a sensed human body, the state notification lamp 151 may blink light of a specific color to notify people of avoidance travel.

The moving robot 100 according to the embodiment of the present disclosure may be set to perform avoidance travel upon sensing a human body or to wait for a predetermined time and then perform avoidance travel depending on whether a person has moved away. In any case, the state notification lamp 151 may constantly output or blink light of a predetermined color for a predetermined time before and during the avoidance travel. When a human body is sensed, the sound output unit 181 may output and provide a voice alert such "Please step aside."

The front direction indicator lamp 152 and the rear direction indicator lamp 153 may indicate a direction and emergency stop. The front direction indicator lamp 152 and the rear direction indicator lamp 153 may be turned on and blink according to the travel direction of the moving robot 100. Further, the front direction indicator lamp 152 and the rear direction indicator lamp 153 may be synchronized with each other to be turned on or blink together.

The front direction indicator lamp 152 and the rear direction indicator lamp 153 may each include indicator lamps corresponding to left and right, respectively. Referring to FIG. 1, the front direction indicator lamp 152 may include a left turn indicator lamp 152L and a right turn indicator lamp 152R. Referring to FIG. 2, the rear direction indicator lamp 153 may include a left turn indicator lamp 153L and a right turn indicator lamp 153R. When the moving robot 100 changes travel direction to the right or left during travel, turn indicator lamps 152L, 152R, 153L, 153R corresponding to the direction in which the moving robot 100 is to turn may be turned on or blink.

While it is illustrated in FIG. 1 that the front direction indicator lamp 152 includes the left turn indicator lamp 152L and the right turn indicator lamp 152R provided adjacent to each other, embodiments of the present disclosure are not limited to the illustrated positions of the turn indicator lamps. For example, the front direction indicator lamp 152 may be arranged such that the indicator lamp 152L corresponding to the left turn and the indicator lamp 152R corresponding to the right turn are spaced apart from each other by a predetermined distance. In performing avoidance travel, the front direction indicator lamp 152 and the rear direction indicator lamp 153 may also indicate deviation from an area through emergency blinking.

The controller 140 may control the lamp unit 150. For example, the controller 140 may control the state notification lamp 151 to output lights of different colors according to the current state of the moving robot 100. The controller 140 may also control the state notification lamp 151 to blink at predetermined intervals for a predetermined time.

The controller 140 may control the front direction indicator lamp 152 and the rear direction indicator lamp 153 to be turned on according to the travel direction of the moving robot 100. The controller 140 may also control the front direction indicator lamp 152 and the rear direction indicator lamp 153 to blink at predetermined intervals for a predetermined time.

The front direction indicator lamp 152 and the rear direction indicator lamp 153 may be driven synchronously. In turning to the left/right, the controller 140 may control the front direction indicator lamp 152 and the rear direction indicator lamp 153 to be turned on or blink in the same manner. In an embodiment, the controller 140 may control the front direction indicator lamp 152 and the rear direction indicator lamp 153 to output light of the same color as the light output from the state notification lamp 151 in a specific situation.

As described above, the controller 140 may recognize the attribute of an obstacle based on the image acquired by the image acquisition unit 120. The controller 140 may control driving of the traveling unit 160 based on the recognized attribute of the obstacle.

For example, if the recognized obstacle attribute corresponds to at least a part of the human body, the controller 140 may control the main body 101 to stop moving. If movement of the recognized body is sensed within a predetermined waiting time, the controller 140 may perform a control operation to resume the existing movement. If movement of the recognized body is not sensed within the predetermined waiting time, the controller 140 may perform a control operation to travel to avoid the recognized body. In addition, if the attribute of the recognized obstacle corresponds to at least a part of a human body, the controller 140 may control the sound output unit 181 to output a predetermined sound.

Figure 4:
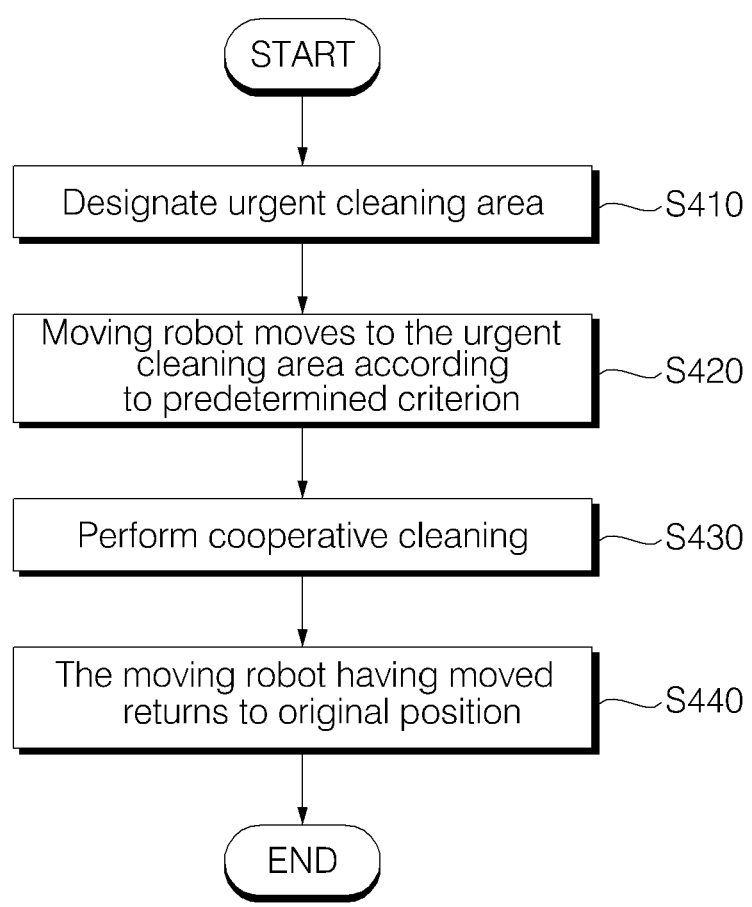
FIG. 4 is a flowchart illustrating a control method of a robot system according to an embodiment of the present disclosure.

FIG. 4 is a flowchart illustrating a control method of a robot system according to an embodiment of the present disclosure. Since a public place such as an airport or a terminal has a very wide area to be cleaned, the whole area may be divided into a plurality of cleaning sections. In addition, one or more moving robots may be assigned to each cleaning area.

The robot system may include a plurality of moving robots, and each of the moving robots may be assigned a cleaning area and perform a cleaning operation in the assigned cleaning area according to the settings. One or more moving robots may be assigned to each cleaning area. It is also possible to allocate a plurality of moving robots to one or more cleaning areas according to user setting.

The robots included in the robot system may share the state of cleaning progress such as the cleaning completion time and the cleaned areas. Accordingly, a robot having completed cleaning may assist another robot not having completed cleaning in performing the cleaning operation.

The robots may share the state of cleaning progress in real time, and robots having completed cleaning may move to an area assigned to another robot not having completed the cleaning operation, identify the cleaning state of the area, and assist the other robot in performing the cleaning operation. In addition, when a moving robot having completed cleaning selects a moving robot to assist, it may determine a moving robot to assist according to a predetermined criterion (priority). For example, a robot having a larger area to be cleaned may be assigned a higher priority, and a robot at a close distance may be assigned a lower priority.

The plurality of moving robots included in the robot system may perform urgent cleaning in response to a situation requiring urgent cleaning as well as performing a cleaning operation according to schedule setting and the like. In the case where multiple moving robots are provided in a large space of a public place, a solution for effective and rapid cleaning is needed when an urgent contaminant is generated.

For example, in issuing a command to remove the urgent contaminant, N moving robots that are closest to the contaminant may perform cleaning of the urgent contaminant. If the administrator designates an area with an urgent contaminant, a robot closest to the contaminant may move to remove/clean the contaminant. If the area having the urgent contaminant is wide or contamination is severe, a plurality of robots may be commanded to clean. After executing the decontamination command, the moving robot may return to the original position.

Referring to FIG. 4, the robot system according to an embodiment of the present disclosure may receive a command designating an urgent cleaning area from a user such as an administrator (S410).

A plurality of moving robots included in the robot system may receive a command designating an urgent cleaning area from a portable terminal of the user (S410). Alternatively, the plurality of moving robots may receive, via the server, the command designating the urgent cleaning area transmitted from the portable terminal of the user (S410).

The command designating the urgent cleaning area may be an instruction for urgent cleaning or may be included in a command to perform urgent cleaning. Based on the command, one or more moving robots among the plurality of moving robots may move to the urgent cleaning area according to a predetermined criterion (S420). One or more moving robots selected according to the predetermined criterion among the plurality of moving robots receiving the command designating the urgent cleaning area may move to the urgent cleaning area to perform the urgent cleaning operation (S420).

In an embodiment, the user may designate the number of moving robots to perform the cleaning operation in the urgent cleaning area through his or her portable terminal. The plurality of moving robots and/or the server may receive a command specifying the number of moving robots to perform the cleaning operation in the urgent cleaning area.

If the server receives a command designating the number of moving robots to perform the cleaning operation in the urgent cleaning area, the server may transmit a signal instructing that the cleaning operation should be performed in the urgent cleaning area by moving robots corresponding to the designated number of moving robots.

In the robot system according to the present disclosure, a plurality of moving robots may share state information such as the cleaning progress state information with each other. In addition, the shared state information may be transmitted to the server so as to be managed, and the server may transmit various kinds of information to the portable terminal of the user.

Selection of moving robots to move to the urgent cleaning area may be performed by the user's portable terminal or the server based on the shared information. Alternatively, a plurality of moving robots may be autonomously selected according to the current state.

For example, a moving robot to clean the urgent cleaning area may be selected based on the distance between the current location and the urgent cleaning area. The moving robot to moving to the urgent cleaning area to clean the urgent cleaning area may be a moving robot which is at the closest distance to the designated urgent cleaning area.

Further, a moving robot to clean the urgent cleaning area may be determined according to predetermined criteria in addition to the distance to the urgent cleaning area. An optimal moving robot may be selected by applying a plurality of criteria in combination. For example, the predetermined criteria may include at least one of the distance to the designated urgent cleaning area, the state of cleaning progress of the assigned cleaning area, a battery condition, the degree of contamination of the designated urgent cleaning area, and a reserved schedule.

A moving robot that has finished cleaning the assigned cleaning area among the moving robots which whose current locations are within a predetermined distance from the designated urgent cleaning area may be selected as a moving robot to perform urgent cleaning. A moving robot of the next priority may be selected except moving robots whose current battery state indicate power insufficient for the moving robots to move to an urgent cleaning area, perform a cleaning operation and return to the original positions, and moving robots which have a scheduled cleaning operation that is to be performed soon. For example, a moving robot which is at a close distance from the urgent cleaning area, has high cleaning progress in the assigned cleaning area, currently has a high battery level, and has enough time to the next scheduled operation.

According to a plurality of predetermined criteria, predetermined weights may be assigned to the corresponding items, and then points of the respective items may be calculated and summed up. A designated number of moving robots may be selected in order from a moving robot that has the greatest sum of points.

For example, the urgent cleaning area may be assigned the highest weight and priority, and a higher weight and priority may be assigned in order of the cleaning progress of the assigned cleaning area and the current battery state. Alternatively, since movement and cleaning operation cannot be performed if the battery state is insufficient, the battery state may be assigned the highest weight and priority.

A moving robot moving to the urgent cleaning area and the moving robot assigned the urgent cleaning area as the cleaning area thereof perform the cleaning operation (S430). A plurality of moving robots may perform a cooperative cleaning operation in the urgent cleaning area to perform urgent cleaning more quickly (S430).

When the cooperative cleaning operation in the urgent cleaning area is completed, the moving robot having moved to the urgent cleaning area may return to the cleaning area assigned thereto (S440). Alternatively, if the moving robot is set to wait at a designated place upon completion of the cleaning operation, the moving robot may move to the designated waiting place. For example, the designated waiting place may be a place where the charging base is provided.

The robot system may further include a guide robot having a display. In this case, the guide robot may move to the urgent cleaning area on the basis of a command designating an urgent cleaning area or a command instructing urgent cleaning, and during the cleaning operation, the guide robot may display, on the display, an image indicating that the guide robot is cleaning.

Accordingly, people may be prevented from moving to the urgent cleaning area and interrupting the cleaning operation at a public place such as an airport, or a plurality of robots performing the cooperative cleaning operation may be prevented from colliding with each other. Once the cleaning operation is completed, the guide robot may leave the urgent cleaning area and return to the location which it left to move to the urgent cleaning area.

A plurality of moving robots may recognize obstacles and contaminants during cleaning operation, movement, or return. One or more of the plurality of moving robots may identify an urgent contaminant whose contamination degree or contamination range is greater than a set reference value in the assigned cleaning area.

Alternatively, a moving robot of the plurality of moving robots may identify an urgent contaminant whose contamination degree or contamination range is greater than a set reference value during movement including return to a designated place. The moving robot identifying the urgent contaminant may transmit the location information on the urgent contaminant to other moving robots or a predetermined electronic device (the server, the portable terminal of the administrator, or the like).

The moving robot identifying the urgent contaminant may capture an image of the urgent contaminant and transmit the captured image to other moving robots or a predetermined electronic device. Then, the administrator may check the current state of the urgent contaminant, and in response thereto, may make a request for a proper operation to the robot system.

Figure 5:
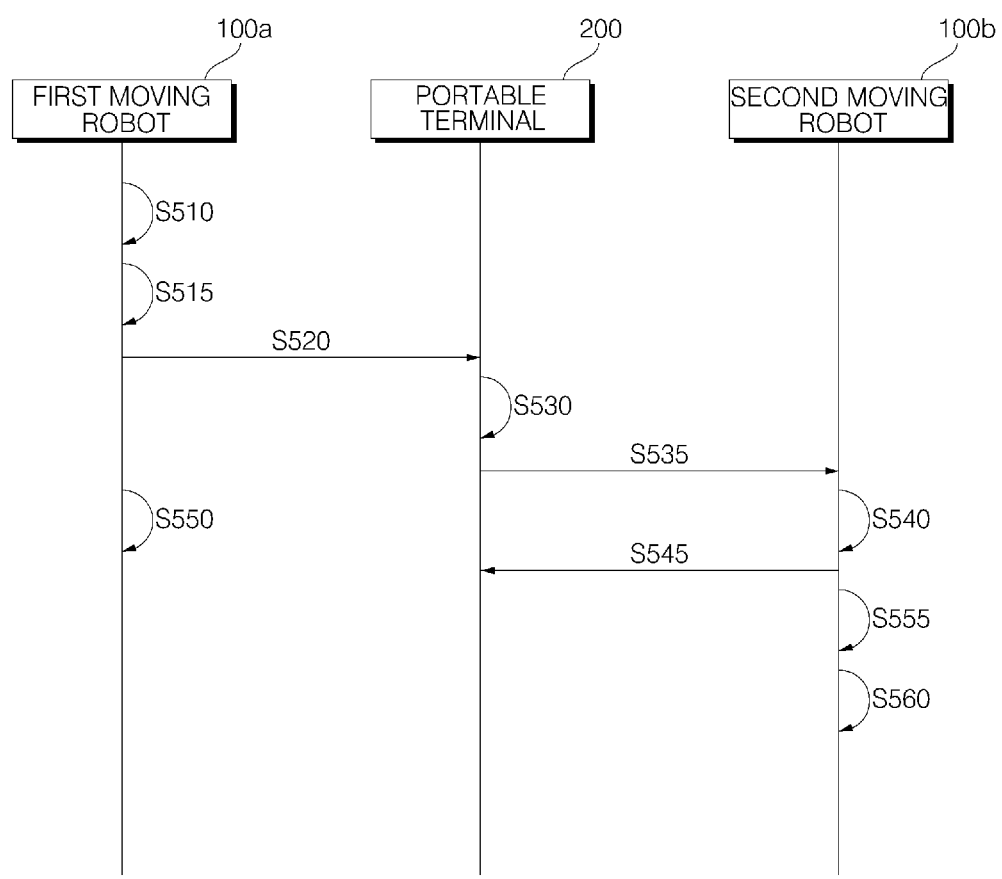
FIG. 5 is a signal flow diagram of a robot system according to an embodiment of the present disclosure.

FIG. 5 is a signal flow diagram of a robot system. A first moving robot 100a may identify an urgent contaminant having a contamination degree or contamination range greater than a set reference value while performing the cleaning operation of the assigned cleaning area, moving to a cleaning area, or returning to a waiting place (S510).

The first moving robot 100a may capture an image of the urgent contaminant (S515), and transmit the captured image to a predetermined electronic device (S520). For example, the first moving robot 100a may transmit the captured image to the portable terminal 200 of the administrator and/or the server.

When the server receives a photograph or a moving image, the server may forward the photograph or the moving image to the portable terminal 200 of the administrator. The portable terminal 200 may display a user interface screen for controlling the first moving robot 100a on a display based on the information received from the first moving robot 100a (S530). The user may confirm the information on the urgent contaminant using the user interface screen displayed on the display means of the portable terminal 200 and input and transmit a command including designation of an urgent cleaning area (S535).

Upon receiving the command including designation of the urgent cleaning area, a second moving robot 100b may move to the urgent cleaning area (S540), and transmit, to the portable terminal 200 and/or the server, a signal indicating whether the second robot is moving (S545).

After transmitting the image (S550), the first moving robot 100a may perform a cleaning operation to remove the urgent contaminant (S550). In addition, the second moving robot 100b having moved to the urgent cleaning area where the urgent contaminant is located may perform a cooperative cleaning operation with the first moving robot 100a in the urgent cleaning area (S555), and then return to the original position after completing cleaning (S560).

Figure 6:
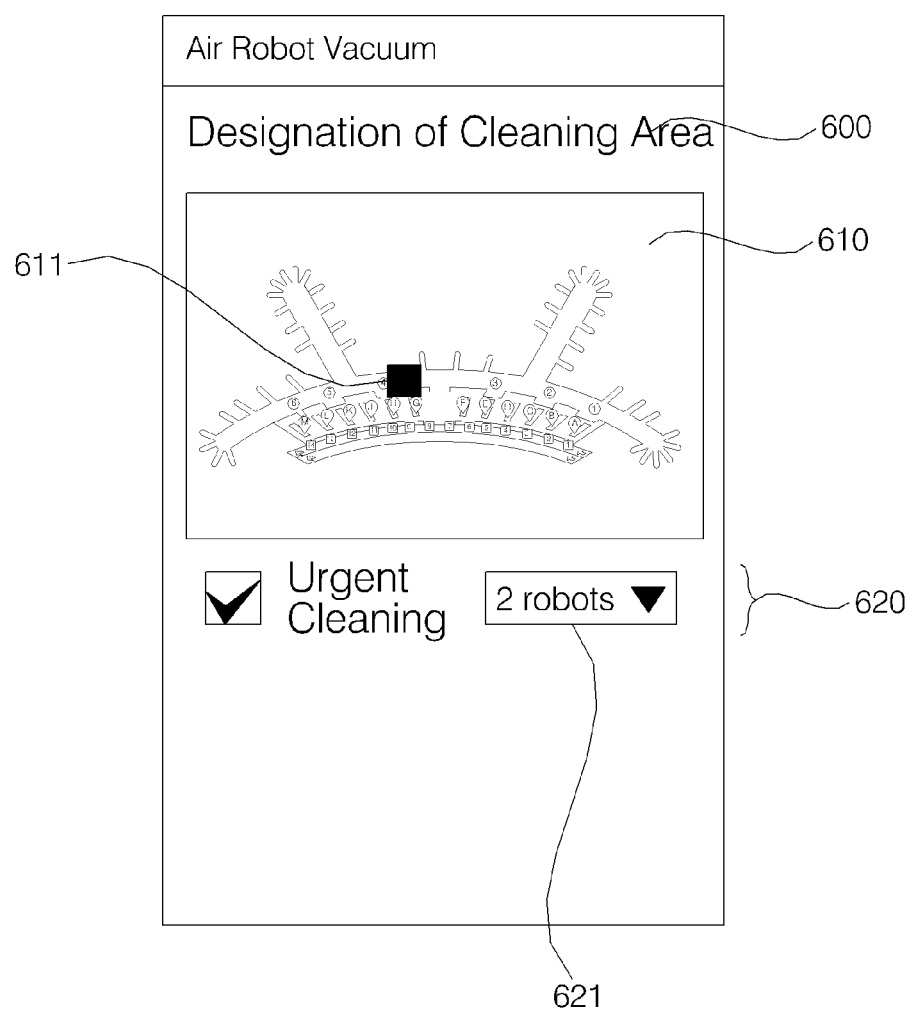
FIGS. 6 to 10 illustrate a control method of a robot system according to an embodiment of the present disclosure.

FIG. 6 illustrates a user interface screen 600 provided through the portable terminal of an administrator when an urgent cleaning command for removing an urgent contaminant is issued. The user may designate an urgent cleaning area 611 by touching a map screen 610 in a user interface screen 600.

When the administrator sends a cleaning command including a command designating the urgent cleaning area 611, one or more moving robots selected according to a predetermined criterion may move to the urgent cleaning area 611 and perform the urgent cleaning operation. For example, when the administrator designates an urgent contaminant emergence area, i.e., the urgent cleaning area 611, a robot closest to the contaminant may move to perform the contaminant removal and cleaning operation. The moving robot may return to the original position after executing the urgent cleaning command.

Figure 7:
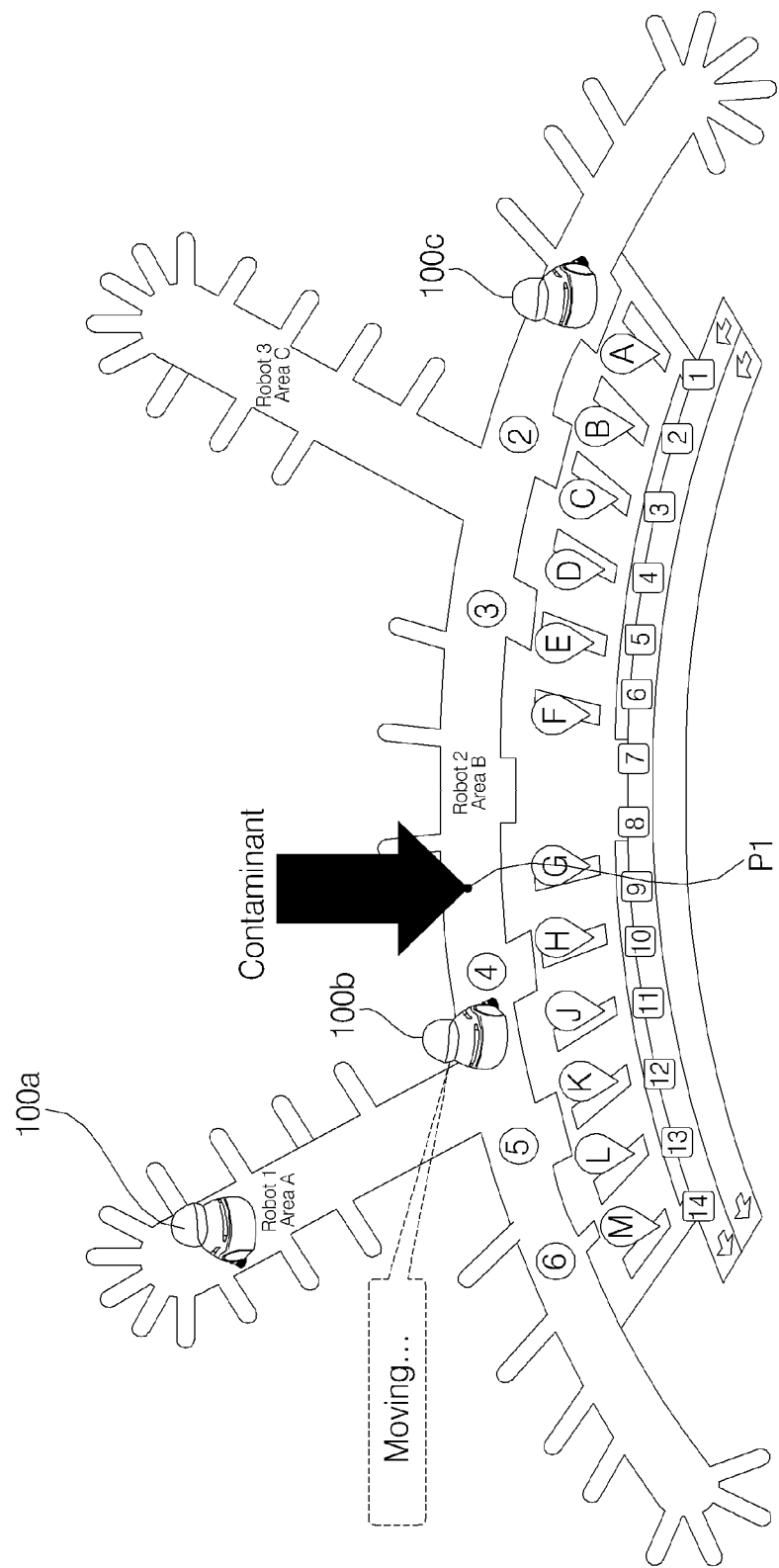

Referring to FIG. 7, unexpected contamination may occur at a predetermined position P1 in area B corresponding to the second moving robot 100b. The administrator may execute a predetermined application through the portable terminal, and issue an urgent cleaning command to the robot system through the user interface screen provided as shown in FIG. 6.

A second moving robot 100b closest to the position P1 of the contaminant may move toward the contaminant, perform the removal and cleaning operation, and then return to the original position. The second moving robot 100b may transmit state information such as "Moving," "In operation," or "Operation completed" to the portable terminal of the administrator or the server.

In addition, if the area where the urgent contaminant emerges is wide or the contamination is severe, the administrator may command multiple moving robots to clean the area. In issuing an urgent contaminant removal command 620, the number 621 of moving robots to perform urgent cleaning may be designated. For example, an administrator may command N robots closest to the contaminant to perform an urgent cleaning operation. When it is assumed that the user has decided to deploy two moving robots, the second moving robot 100b at the closest position and another moving robot may be deployed.

Figure 8:
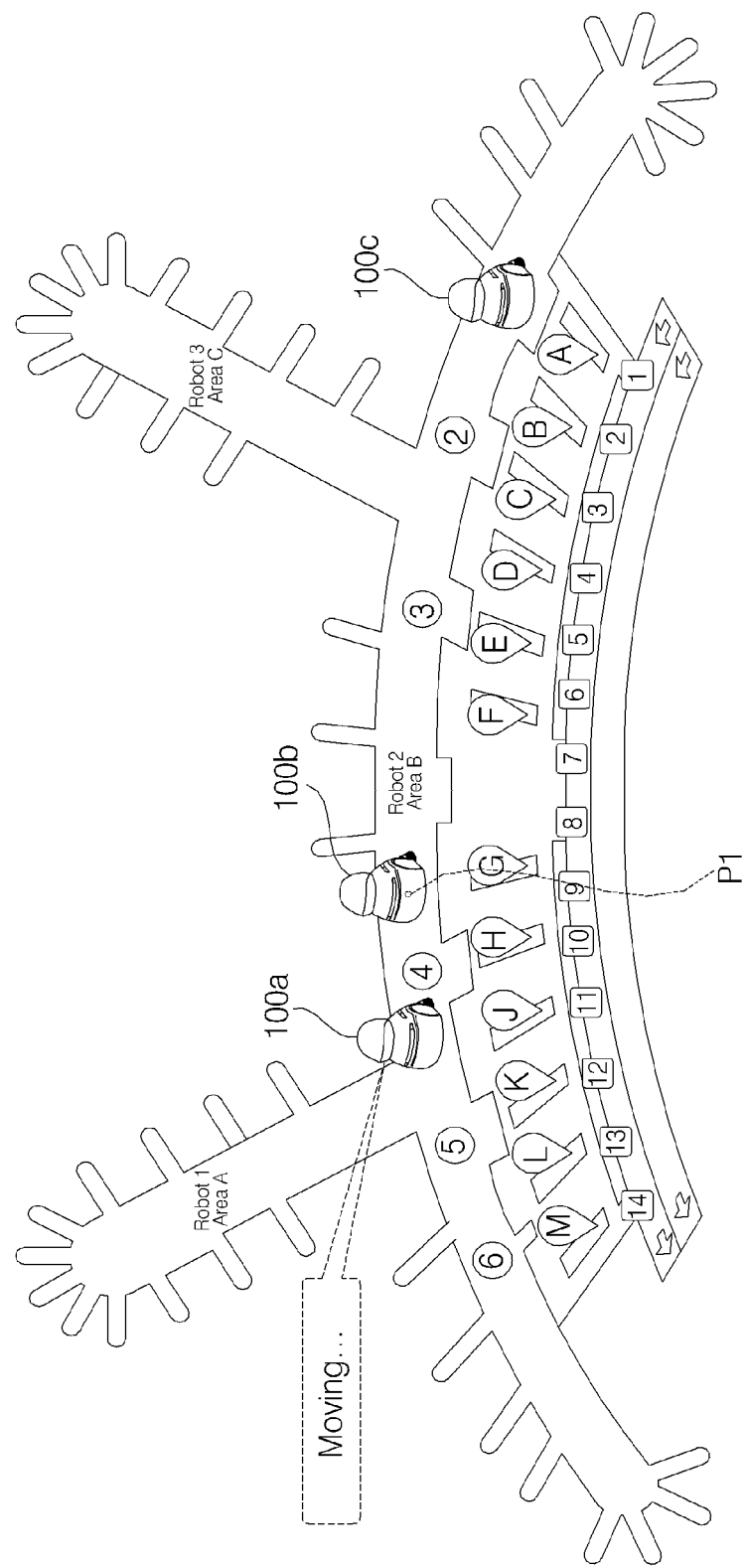

Referring to FIG. 8, the first moving robot 100a that is currently closest to a contaminant position P1 between the first moving robot 100a allocated to area A and a third moving robot 100c allocated to area C may move to the contaminant position P1 to perform urgent cleaning. The first moving robot 100a may transmit state information such as "Moving" to the portable terminal of the administrator or the server. After moving to the contaminant position P1, the first moving robot 100a may remove the urgent contaminant together with the second moving robot 100b, and then return to the original position.

Meanwhile, the moving robot, such as the third moving robot 100c, which has completed cleaning of area C assigned thereto, may wait at a waiting place other than the area which the cleaning robot is in charge of. If the third moving robot 100c in the waiting state is closer to the contaminant position P1 than the first moving robot 100a, if the battery level of the first moving robot 100a is insufficient, or if the state of cleaning progress of area A is currently less than a predetermined reference value, the third moving robot 100c may be deployed for urgent cleaning instead of the first moving robot 100a.

Figure 9:
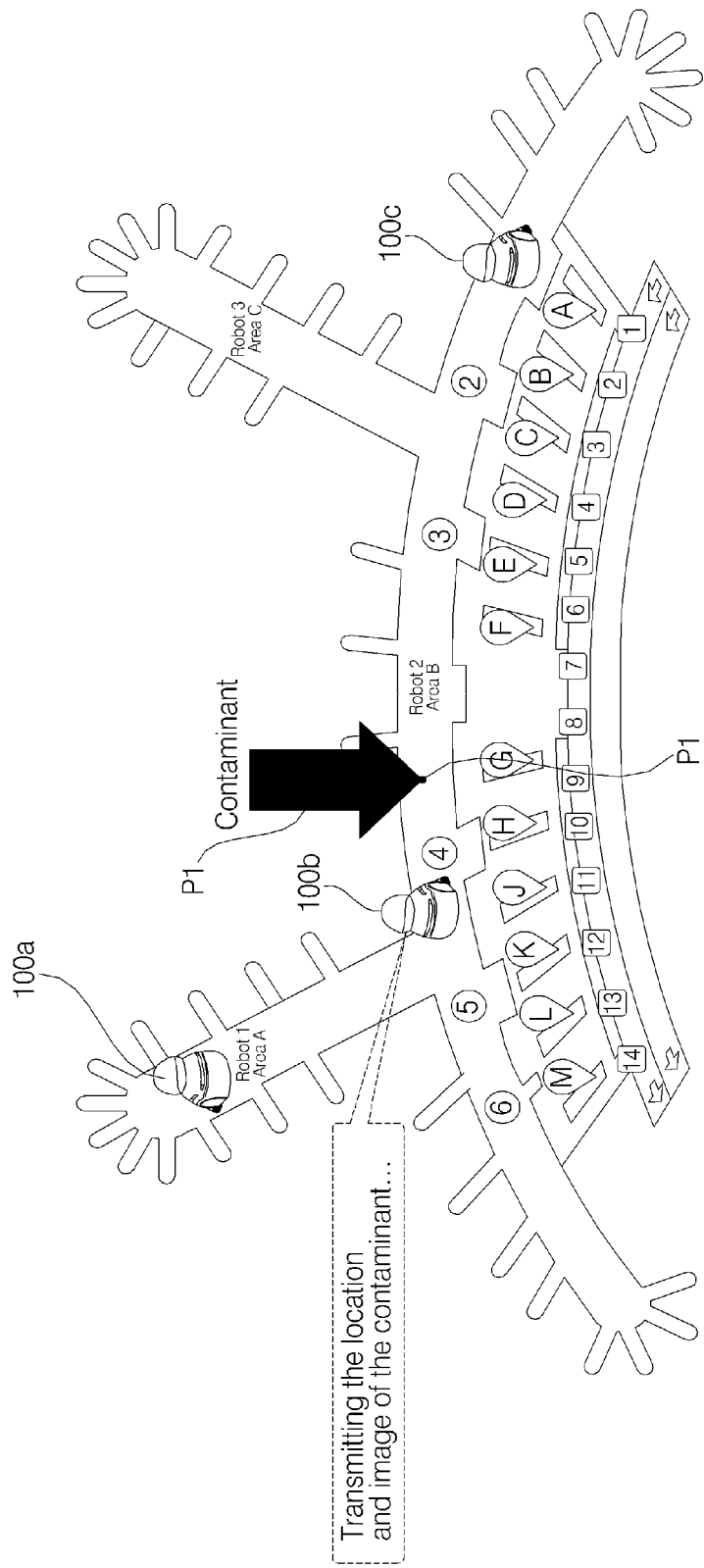
Figure 10:
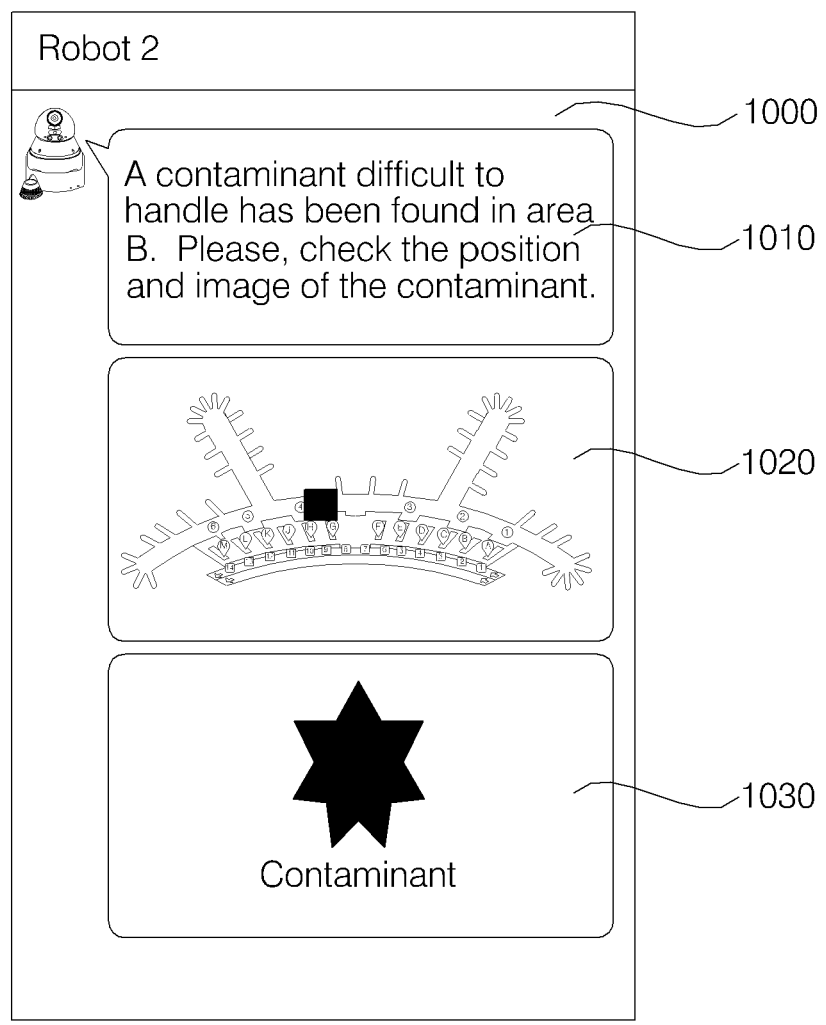

FIG. 9 illustrates a situation in which a moving robot identifying an urgent contaminant sends a report to an administrator, and FIG. 10 illustrates a user interface screen including the content of the report of the moving robot provided through the administrator's portable terminal.

Referring to FIG. 9, unexpected contamination may occur at a predetermined position P1 in area B corresponding to the second moving robot 100b. If the second moving robot 100b detects a contaminant which the second moving robot 100b would have difficulty handling alone, it may make a request for assistance to the administrator or another robot.

In this case, if the second moving robot 100b determines that it is difficult for the second moving robot 100b to handle the contaminant found during cleaning or movement/return, it may capture a photograph of the contaminant and send a message to the portable terminal of the administrator and/or the server. Alternatively, the second moving robot 100b may perform cleaning by requesting assistance from other moving robots 100a, 100c, etc.

The administrator may determine the situation through the user interface screen 100 and instruct handling of the situation, based on the contaminant emergence information 1010, the contaminant position 1020 and the contaminant image 1030 sent from the second moving robot 100b. For example, if the contaminant can be handled in cooperation with other robots, the administrator may command the nearest N moving robots to perform urgent cleaning.

Moving robots receiving the urgent cleaning command may move and remove the contaminant and then return to the original positions thereof. When the administrator determines that the contaminant cannot be removed only by the robots after checking the situation through the contaminant image 1030, the administrator may decide to deploy workers in place of moving robots or deploy workers to cooperate with the moving robots.

Figure 11:
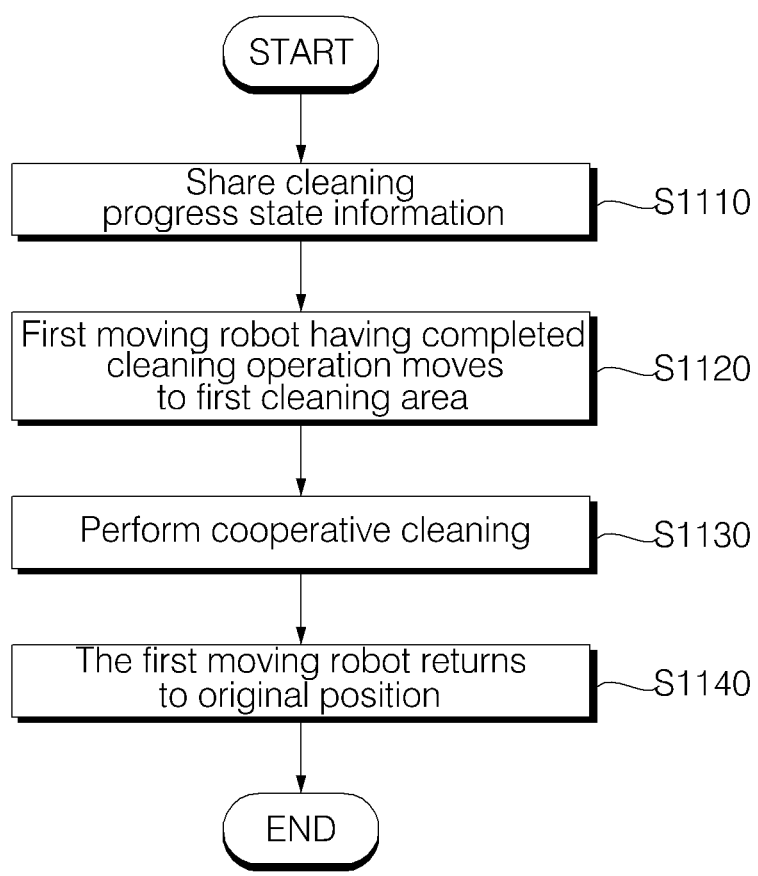
FIG. 11 is a flowchart illustrating a control method of a robot system according to an embodiment of the present disclosure.

FIG. 11 is a flowchart illustrating a control method of a robot system, where the moving robots may share the states of cleaning progress such that a moving robot having completed the cleaning operation can assist a moving robot not having completed the cleaning operation.

A plurality of moving robots may share the cleaning progress state information with each other (S1110). Among the moving robots, a first moving robot that has completed the cleaning operation of the cleaning area assigned thereto may move to a first cleaning area assigned to another moving robot according to a predetermined criterion for support (S1120), and perform the cleaning operation together with the moving robot allocated to the first cleaning area (S1130).

The moving robots may share their cleaning progress states including the cleaning completion time and cleaned areas in real time. Accordingly, a moving robot that has completed cleaning of the area assigned thereto may move to the area of a moving robot that has not completed the cleaning operation, and check the area that has not been cleaned, and then assist the cleaning operation (S1130). In addition, in selecting a moving robot for the moving robot having completed cleaning to assist, the moving robot that needs assistance may be determined according to the predetermined support criterion (priority).

For example, a robot having a wider part to be cleaned may be assigned a higher priority than a robot positioned at a closer distance. When the first moving robot finishes cleaning in area A, it may check the states of cleaning progress of other moving robots which are performing the cleaning operation, and then move to area B of the second moving robot that has the largest portion to be cleaned among other moving robots (S1120). Then, the first moving robot and the second moving robot may perform a cooperative cleaning operation in area B that needs to be cleaned (S1130).

Meanwhile, the first moving robot may transmit movement and cleaning operation information to a predetermined electronic device. The first moving robot may transmit, to the portable terminal of the administrator and/or the server, information indicating that the first moving robot is moving or indicating that the first moving robot is performing cooperative cleaning. When the cleaning operation is completed, the first moving robot may return to the cleaning area assigned thereto (S1140).

Figure 14:
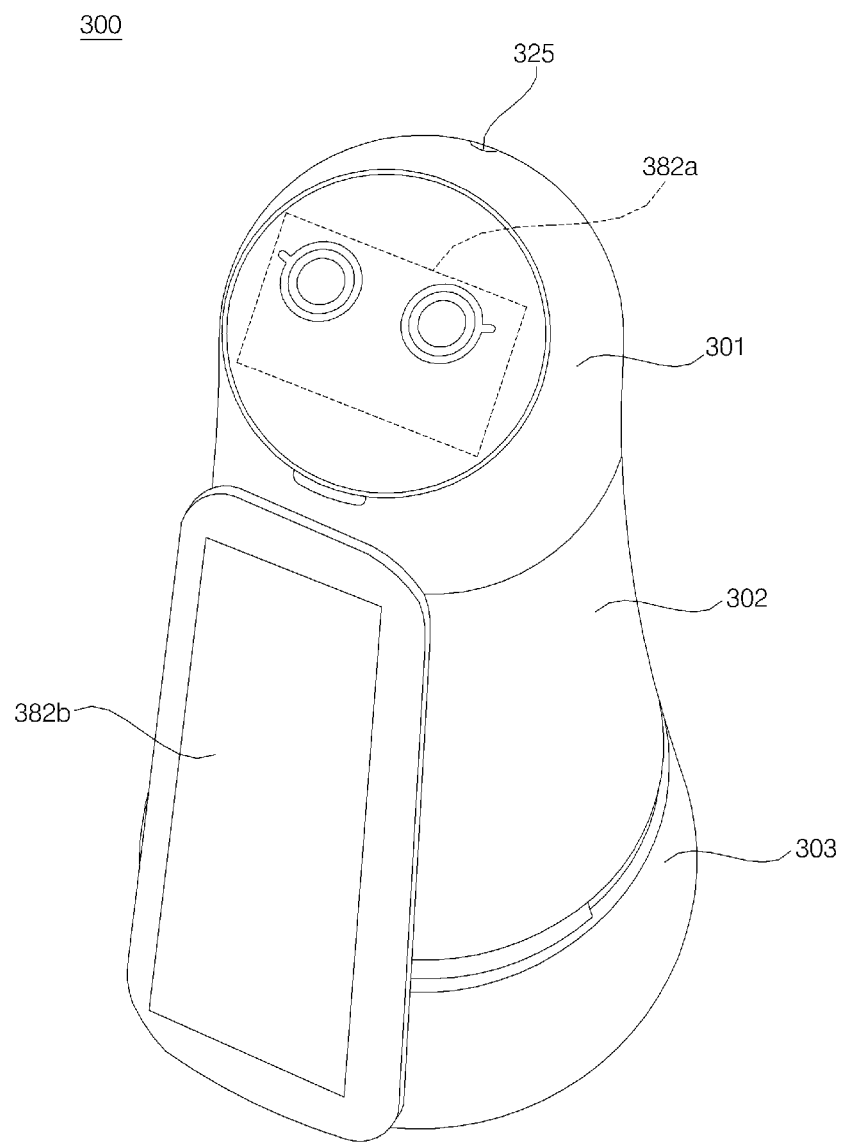
FIG. 14 is a view showing the appearance of a guide robot included in a robot system according to an embodiment of the present disclosure.
Figure 15:
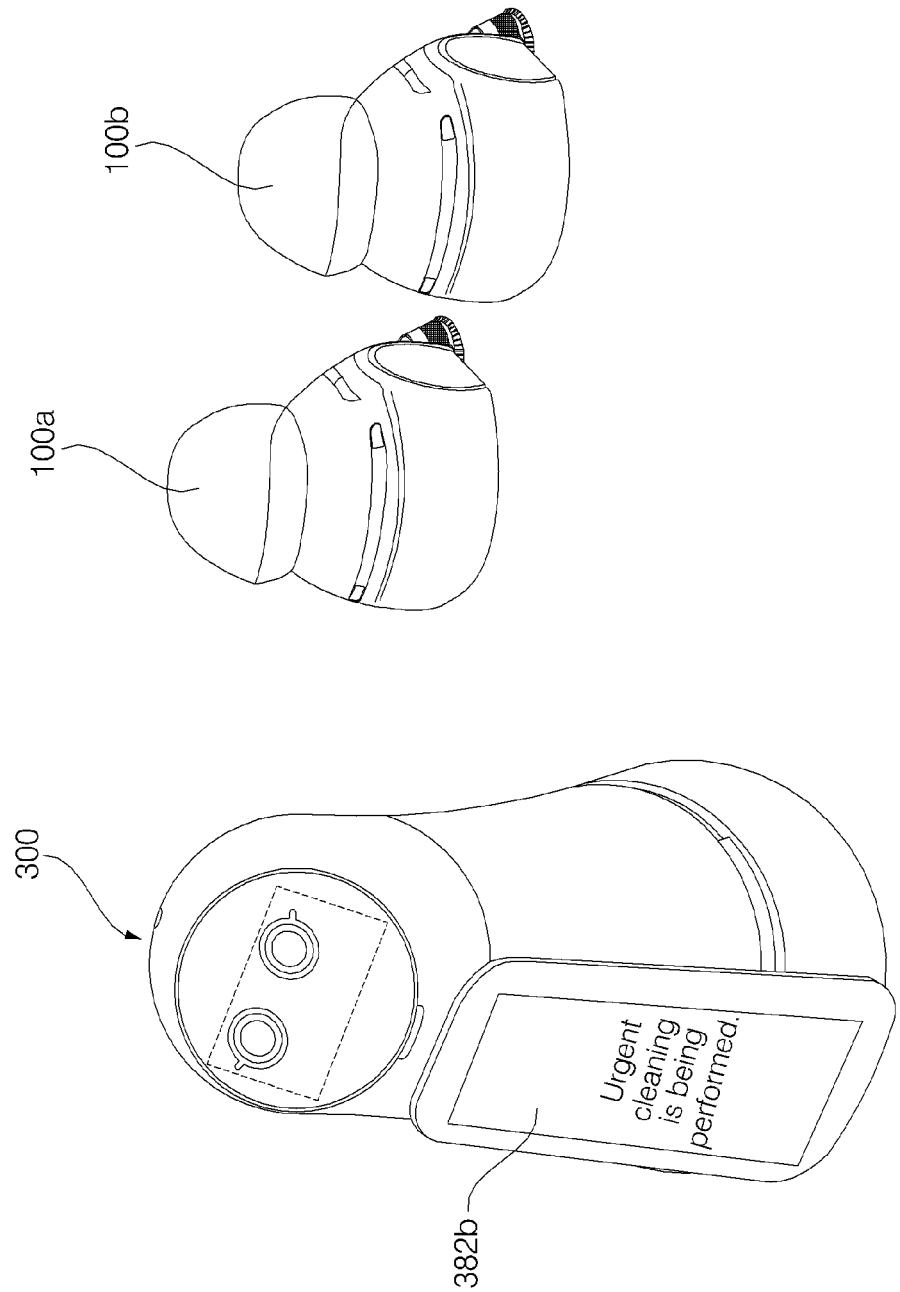
FIG. 15 illustrates a control method of a robot system according to an embodiment of the present disclosure.

The robot system according to an embodiment of the present disclosure may further include a guide robot having a display which is described in FIGS. 14 and 15. In this case, as the first moving robot moves to area B which the second moving robot is in charge of, the guide robot sharing information about the situation may move to the first cleaning area (area B which the second moving robot is in charge of).

During the cooperative cleaning operation by the first moving robot and the second moving robot, the guide robot may display, on the display thereof, an image indicating that cleaning is being performed. Accordingly, people may be prevented from moving to the area where the cooperative cleaning is performed and interrupting the cleaning operation at a public place such as an airport, or a plurality of robots performing the cooperative cleaning operation may be prevented from colliding with each other. When the cleaning operation is completed, the guide robot may leave the first cleaning area and return to the location which it left to move to the first cleaning area.

Figure 12:
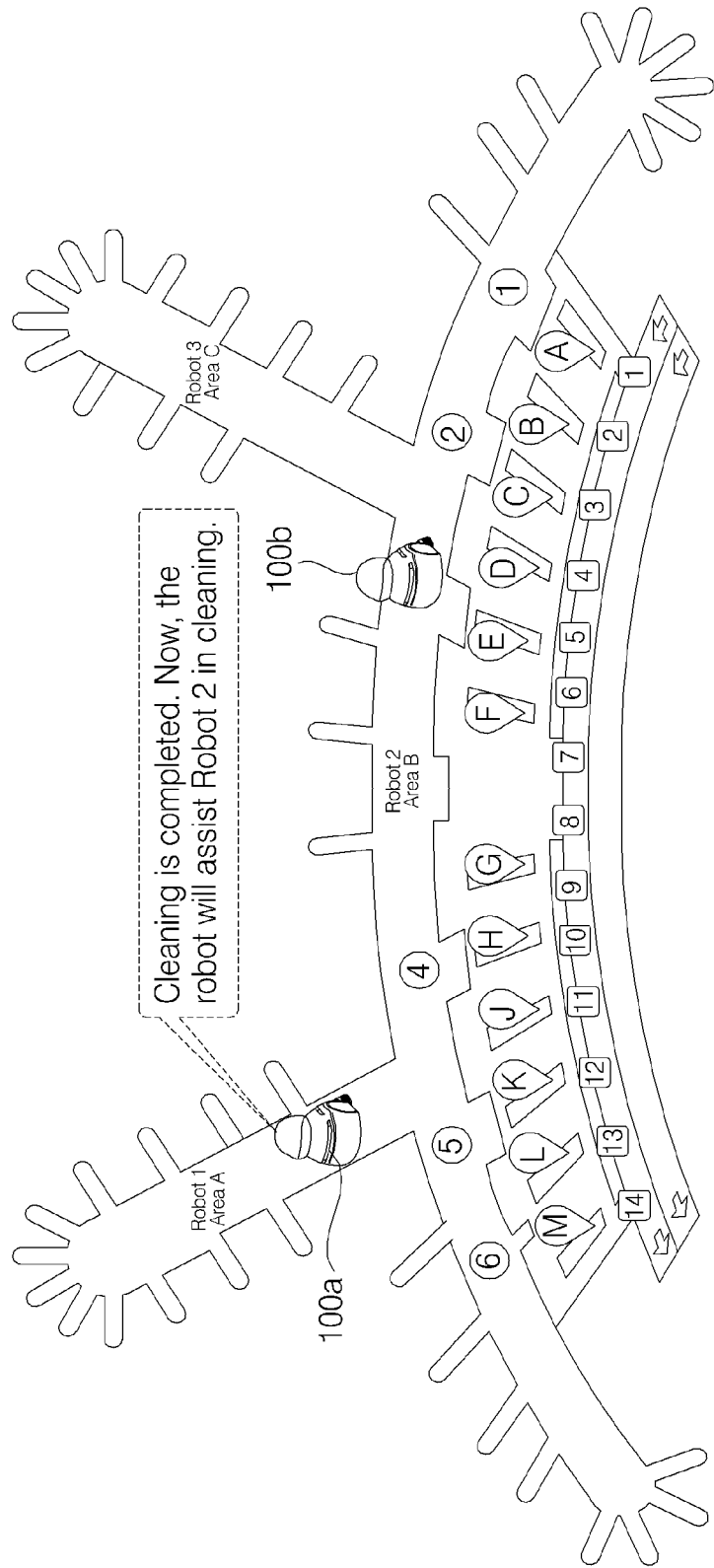
FIGS. 12 and 13 illustrate a control method of a robot system according to an embodiment of the present disclosure.
Figure 13:
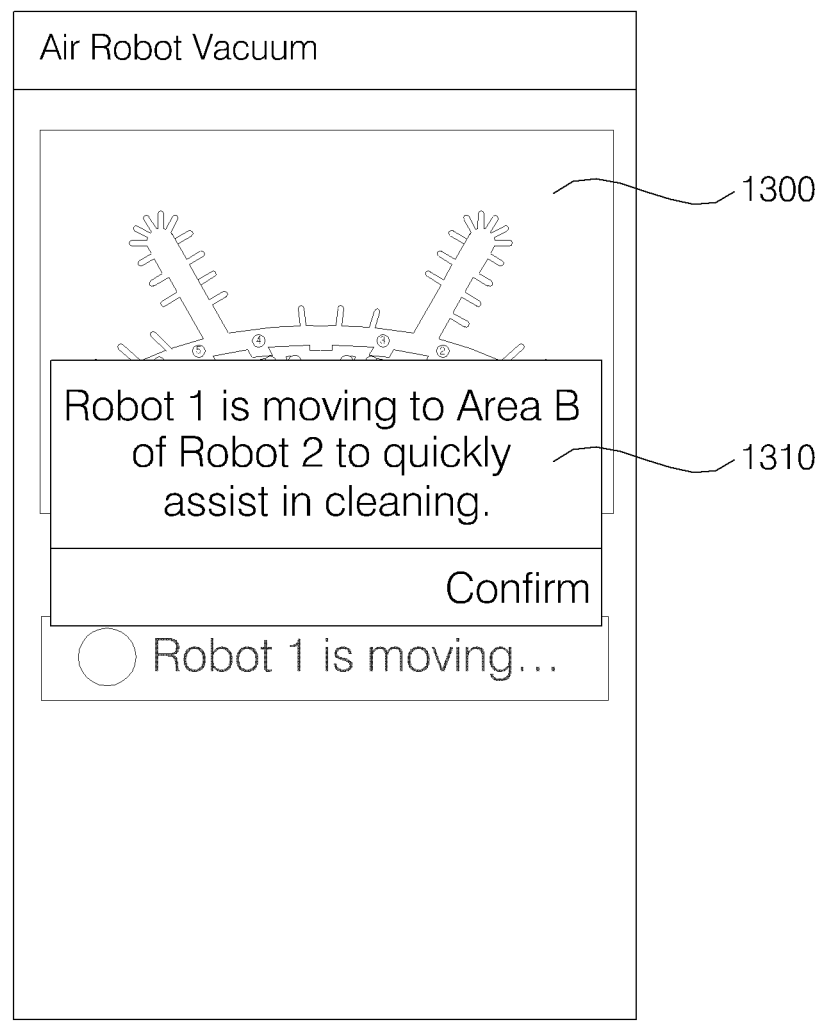

FIGS. 12 and 13 illustrate a control method of a robot system, where a plurality of moving robots may share the cleaning progress state information with each other.

Referring to FIG. 12, the first moving robot 100*a* which is in charge of area A may check areas that have not been cleaned after completing cleaning of area A. The first moving robot 100*a* may check the shared cleaning progress state and may determine a support target cleaning area that satisfies preset criteria for support. For example, the first moving robot 100*a* may determine area B that is the closest to the current location or has the lowest cleaning progress as the support target cleaning area.

When the first moving robot 100*a* is determined to perform the cooperative cleaning operation in support of the second moving robot 100*b* which is in charge of area B, the first moving robot 100*a* may transmit, to the portable terminal of the administrator, the server, or the like, a signal indicating completion of cleaning and support of cleaning. For example, the first moving robot 100*a* may transmit, to the portable terminal of the user, a message such as "Cleaning has been completed. Now the robot will assist Robot 2 in cleaning."

Referring to FIG. 13, the administrator may check the message and operation information of the first moving robot 1310 provided through the user interface screen 1330 provided through the portable terminal of the administrator. As described above with reference to FIGS. 4 to 10, any robot among the plurality of moving robots included in the robot system may identify an urgent contaminant whose contamination degree or contamination range is greater than a set reference value in the assigned cleaning area.

In this case, the moving robot identifying the urgent contaminant may transmit the location information on the urgent contaminant to other moving robots to request support of urgent cleaning. The moving robot identifying the urgent contaminant may transmit the location information on the urgent contaminant to N moving robots positioned closest to the location of the contaminant.

In addition, if the moving robot identifying the urgent contaminant determines that the identified urgent contaminant cannot be handled, the moving robot identifying the urgent contaminant may transmit the location information on the contaminant to a predetermined electronic device. The moving robot identifying the urgent contaminant may transmit the location information on the urgent contaminant to the portable terminal of the administrator and/or the server when it is determined that the moving robot alone cannot handle the identified urgent contaminant.

The moving robot identifying the urgent contaminant may also capture an image of the urgent contaminant and transmit the captured image to the predetermined electronic device. Then, the administrator may check the current state of the urgent contaminant, and in response thereto, may make a request for a proper operation to the robot system or deploy workers.

When an urgent contaminant emerges, a robot nearest the contaminant may move to remove the contaminant and perform a cleaning operation. In addition, the robots may share the cleaning progress states thereof with each other such that a moving robot having completed the cleaning operation can approach and assist a moving robot not having completed the cleaning operation in quickly completing the cleaning operation.

Further, when a robot finds a contaminant that is difficult for the robot to handle alone, it may make a request for assistance to an administrator or another robot. If one of the robots determines that it is difficult to handle a contaminant found during cleaning or return by itself, it may capture an image of the contaminant to send a message to the administrator or to make a request for assistance to another robot such that cleaning can be performed. The administrator may also determine and handle the situation based on the location and image of the contaminant sent by the robot. If the contaminant can be handled in cooperation with another robot, the administrator may issue a command of urgent cleaning to the nearest N robots.

The robot system may further include a guide robot having a display. When a moving robot that has identified an urgent contaminant transmits location information on the urgent contaminant to another moving robot, the guide robot receiving this information may move to the area corresponding to the location information on the urgent contaminant, and display an image informing that cleaning is being performed on the display during the cleaning operation.

Accordingly, people may be prevented from moving to the urgent cleaning area and interrupting the cleaning operation at a public place such as an airport, or a plurality of robots performing the cooperative cleaning operation may be prevented from colliding with each other. Once the cleaning operation is completed, the guide robot may leave the area corresponding to the location information on the urgent contaminant and return to the location which it left to move to the area.

FIG. 14 is a view showing the appearance of a guide robot included in a robot system, and FIG. 15 illustrates an operation of the guide robot. The robot system having a guide robot 300 may be provided in a public place to provide predetermined information and services.

Referring to FIG. 14, the guide robot 300 may include a main body 301, 302, 303 that defines an outer appearance and accommodates various components therein. The main body 301, 302, 303 may include a body 302 forming a housing space for accommodating various components constituting the guide robot 300, a head 301 provided on the upper side of the body 102, and a support 303 provided on the lower side of the body 302 so as to support the body 302.

A body display 382b capable of displaying an image may be provided on the front surface of the body 302. The body display 382b may be configured with a large screen to allow the user to more easily recognize predetermined information.

The head 301 may also have a head display 382a, which is capable of displaying an image, on the front surface of thereof. The guide robot 300 may include a voice input unit 325 for receiving a user's voice input, the voice input unit 325 including a microphone (MIC) for receiving an audio signal, and a sound output unit for outputting a predetermined sound under control of a controller for controlling the overall operation of the guide robot 300.

The voice input unit 125 may include a processor for converting analog sound into digital data or may be connected to the processor to convert a user input voice signal into data to be recognized by the controller 140 or the server. The microphone may be provided at a position suitable for receiving a voice signal. The sound output unit may audibly output a warning sound, a notification message for an operation mode, an operation state, an error state, etc., information corresponding to a request input of the user, and a processing result corresponding to the request input of the user, under control of the controller.

As described above, the guide robot 300 may include a head display 382a provided on the front surface of the head 301 and a body display 382b provided on the front surface of the body 302. The displays 382a and 382b may display a predetermined image under control of the controller. The displays 382a and 382b may form a layered structure together with a touch pad, thereby implementing a touchscreen. In this case, the displays 382a and 382b may be used not only as output devices but also as input devices for inputting information by user touch. The head display 382a and/or the body display 382b may be configured as a touchscreen to receive user touch input.

The guide robot 300 may further include a traveling unit for moving the main body 301, 302, 303, and a communication unit for transmitting and receiving data by communicating with other devices such as a portable terminal, a server, or other robots. The guide robot 300 may receive movement information and cleaning progress state information, and the like about the moving robots included in the robot system via the communication unit.

Accordingly, the guide robot 300 may recognize whether the moving robots detect an urgent contaminant and thus perform an urgent cleaning operation or a cooperative cleaning operation with other moving robots. When a command designating an urgent cleaning area, a command instructing urgent cleaning, or location information on the urgent contaminant is received, or movement of a moving robot for cooperative cleaning is sensed, the guide robot 300 may also move to the corresponding area.

Referring to FIG. 15, when the first moving robot 100a and the second moving robot 100b begin the urgent cleaning operation in response to identification of the urgent contaminant, the guide robot 300 may move to the place where the first moving robot 100a and the second moving robot 100b are performing urgent cleaning. The guide robot 300 may display, on the display 382b, an image indicating that urgent cleaning is in progress. The guide robot 300 may also output a warning sound, a warning message, a guidance message, or the like in the form of sound through the sound output unit.

People may be prevented or warned from moving to the urgent cleaning area and interrupting the cleaning operation at a public place such as an airport, or a plurality of robots performing the cooperative cleaning operation may be prevented from colliding with each other. Once the cleaning operation is completed, the guide robot may leave the urgent cleaning area and return to the location which it left to move to the urgent cleaning area.

Additional details of the guide robot may be found in U.S. application Ser. No. 15/853,409, U.S. application Ser. No. 15/853,533, and U.S. application Ser. No. 15/853,587, all filed on Dec. 22, 2017, which are hereby incorporated by reference in their entirety. Further, one of ordinary skill in the art will recognize that features disclosed in these above-noted applications may be combined in any combination with features disclosed herein.

According to at least one of the embodiments of the present disclosure, a large space may be effectively cleaned.

According to at least one of the embodiments of the present disclosure, a situation requiring urgent cleaning may be effectively coped with.

According to at least one of the embodiments of the present disclosure, a robot system which a user can conveniently control by checking information and a control method thereof are provided. Thereby, user convenience may be improved.

The control method of the robot system according to embodiments of the present disclosure is implementable by processor-readable code on a processor-readable recording medium. The processor-readable recording medium includes all kinds of recording devices for storing data which can be read by the processor. Examples of the recording medium readable by the processor include ROM, RAM, CD-ROM, magnetic tape, floppy disk, and optical data storage. The method is also implementable in the form of a carrier wave such as transmission over the Internet. In addition, the recording medium readable by the processor may be distributed to computer systems connected over a network, and code which can be read by the processor in a distributed manner may be stored in the recording medium and executed.

A user can conveniently control the robot system by checking information and a control method thereof.

A robot system may include a plurality of moving robots each assigned a cleaning area, the method may include receiving a command designating an urgent cleaning area, at least one moving robot of the plurality of moving robots moving to the urgent cleaning area according to a predetermined criterion based on the command, performing a cleaning operation by the moving robot having moved to the urgent cleaning area and a moving robot assigned the urgent cleaning area as a cleaning area, and returning to an assigned cleaning area by the moving robot having moved to the urgent cleaning area when the cleaning operation is completed.

A method of controlling a robot system may include a plurality of moving robots each assigned a cleaning area, where the plurality of moving robots share cleaning progress state information, moving, by a first moving robot having completed a cleaning operation in a cleaning area assigned thereto among the plurality of moving robots, to a first cleaning area assigned to another moving robot, according to a preset support criterion, performing a cleaning operation by the first moving robot and the moving robot assigned the first cleaning area, and the first moving robot returning to a cleaning area assigned thereto when the cleaning operation is completed.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a robot system including a plurality of moving robots, each assigned a cleaning area, the method comprising:
   receiving a command designating a region as an urgent cleaning area when one of the plurality of moving robots identifies an urgent contaminant whose contamination degree or contamination range is greater than a predetermined reference value in the region;
   at least one moving robot from the plurality of moving robots moving to the urgent cleaning area according to a predetermined criterion based on the command;
   performing a cleaning operation by the moving robot having moved to the urgent cleaning area; and
   returning to the previously assigned cleaning area by the moving robot having moved to the urgent cleaning area when the cleaning operation is completed.

2. The method according to claim 1, further comprising:
receiving a command designating a number of the moving robots to perform the cleaning operation in the urgent cleaning area; and
commanding a number of the moving robots corresponding to the designated number of the moving robots to perform the cleaning operation in the urgent cleaning area.

3. The method according to claim 1, wherein the predetermined criterion includes at least one of a distance to the designated urgent cleaning area, a state of cleaning progress of an assigned one of the cleaning areas, a battery condition, a degree of contamination of the designated urgent cleaning area, or a reserved schedule.

4. The method according to claim 1, wherein the robot system further includes a guide robot having a display, and the method further comprises:
the guide robot moving to the urgent cleaning area based on the command;
the guide robot displaying on the display an image informing that cleaning is being performed during the cleaning operation; and
returning the guide robot to a position before movement to the urgent cleaning area when the cleaning operation is completed.

5. The method according to claim 1, further comprising:
transmitting, by the moving robot having identified the urgent contaminant, location information on the urgent contaminant to another moving robot or a predetermined electronic device.

6. The method according to claim 5, further comprising:
capturing, by the moving robot having identified the urgent contaminant, an image of the urgent contaminant; and
transmitting, by the moving robot having identified the urgent contaminant, the image of the urgent contaminant to the other moving robot or the predetermined electronic device.

7. The method according to claim 1, wherein the moving robot moving to the urgent cleaning area is one of the plurality of moving robots that is located at a closest distance to the designated urgent cleaning area.

8. The method according to claim 1, wherein the cleaning operation is cooperatively performed by the moving robot identifying the urgent contaminant and the moving robot having moved to the urgent cleaning area.

9. The method according to claim 1, wherein the cleaning operation is cooperatively performed by the moving robot having moved to the urgent cleaning area and another moving robot assigned to clean a region associated with the urgent cleaning area.

10. The method according to claim 1, wherein identifying the urgent contaminant includes determining that another moving robot assigned to clean a region associated with the urgent cleaning area cannot handle a detected contaminant by itself.

11. A method of controlling a robot system including a plurality of moving robots that are each assigned a cleaning area, the method comprising:
identifying, by one of the plurality of moving robots, an urgent contaminant whose contamination degree or contamination range is greater than a predetermined reference value;
sharing cleaning progress state information including location information on the urgent contaminant among the plurality of moving robots;
moving, by a first moving robot having completed a cleaning operation in a cleaning area assigned thereto among the plurality of moving robots, to a first cleaning area having the urgent contaminant and assigned to another moving robot, according to a preset support criterion;
performing a cleaning operation by the first moving robot and the moving robot assigned the first cleaning area; and
returning the first moving robot to the cleaning area assigned to the first moving robot when the cleaning operation is completed.

12. The method according to claim 11, further comprising:
transmitting movement and cleaning operation information to a predetermined electronic device by the first moving robot.

13. The method according to claim 11, wherein the sharing of the cleaning progress state information including the location information on the urgent contaminant comprises transmitting the location information on the urgent contaminant to a quantity (N) of the moving robots positioned closest to a location of the urgent contaminant.

14. The method according to claim 11, further comprising:
transmitting, by the moving robot having identified the urgent contaminant, the location information on the urgent contaminant to a predetermined electronic device when the identified urgent contaminant is determined to be an untreatable contaminant.

15. The method according to claim 14, further comprising:
capturing, by the moving robot having identified the urgent contaminant, an image of the urgent contaminant; and
transmitting, by the moving robot having identified the urgent contaminant, the image of the urgent contaminant to the predetermined electronic device.

16. The method according to claim 11, wherein the robot system further includes a guide robot having a display, and the method further comprises:
transmitting, by the moving robot having identified the urgent contaminant, the location information on the urgent contaminant to another moving robot;
moving to an area corresponding to the location information on the urgent contaminant by the guide robot;
displaying on the display of the guide robot an image informing that cleaning is being performed during the cleaning operation; and
returning the guide robot to a position of the guide robot before movement to the area corresponding to the location information on the urgent contaminant when the cleaning operation is completed.

17. The method according to claim 11, wherein the robot system further includes a guide robot having a display, and the method further comprises:
moving to the first cleaning area by the guide robot;
displaying on the display of the guide robot an image informing that cleaning is being performed during the cleaning operation; and
returning the guide robot to an associated position before movement to the first cleaning area when the cleaning operation is completed.

18. The method according to claim 11, wherein identifying the urgent contaminant includes determining that the moving robot assigned the first cleaning area cannot handle a detected contaminant by itself.

* * * * *